US012775128B2

(12) United States Patent
Scherschlicht et al.

(10) Patent No.: US 12,775,128 B2
(45) Date of Patent: Oct. 27, 2026

(54) ANTI-REFLECTIVE COATING HAVING IR PROTECTION AND MIRRORING AT HIGHER ANGLES OF INCIDENCE

(71) Applicant: Rodenstock GmbH, Munich (DE)

(72) Inventors: Rüdiger Scherschlicht, Unterhaching (DE); Stefan Radünz, Gilching (DE)

(73) Assignee: Rodenstock GmbH, Munich (DE)

( * ) Notice: Subject to any disclaimer, the term of this patent is extended or adjusted under 35 U.S.C. 154(b) by 397 days.

(21) Appl. No.: 18/555,951

(22) PCT Filed: Apr. 21, 2022

(86) PCT No.: PCT/EP2022/060538
§ 371 (c)(1),
(2) Date: Mar. 13, 2024

(87) PCT Pub. No.: WO2022/223685
PCT Pub. Date: Oct. 27, 2022

(65) Prior Publication Data

US 2024/0353601 A1 Oct. 24, 2024

(30) Foreign Application Priority Data

Apr. 23, 2021 (DE) ..................... 10 2021 204 079.9

(51) Int. Cl.
*G02B 5/08* (2006.01)
*G02B 1/115* (2015.01)
(Continued)

(52) U.S. Cl.
CPC .............. *G02B 5/208* (2013.01); *G02B 1/115* (2013.01); *G02B 5/26* (2013.01); *G02C 7/104* (2013.01)

(58) Field of Classification Search
CPC ... G02B 1/00; G02B 1/10; G02B 1/11; G02B 1/111; G02B 1/113; G02B 1/115;
(Continued)

(56) References Cited

U.S. PATENT DOCUMENTS 4,556,599 A 12/1985 Sato et al.
9,291,746 B2 * 3/2016 Avetisian, Sr. .. B29D 11/00865
(Continued)

FOREIGN PATENT DOCUMENTS

DE 102016120122 B3 1/2018
DE 102020105576 A1 9/2020
(Continued)

OTHER PUBLICATIONS

English Machine Translation of the EP reference No. 3702830 published on Sep. 2, 2020.*
Aug. 16, 2022 (PCT) International Search Report and Written Opinion—App. PCT/EP2022/060538.
Mar. 30, 2026 (AU) Examination Report—App. 2022260136.

*Primary Examiner* — Thong Q Nguyen
(74) *Attorney, Agent, or Firm* — Banner & Witcoff, Ltd.

(57) ABSTRACT

The invention relates to a layer system having infrared mirroring according to one aspect, comprising a substrate base comprising a substrate sheet having a substrate surface; and a plurality of low-refraction layers and a plurality of high-refraction layers, which are arranged with high-refraction and low-refraction layers alternating on the substrate surface such that, at a detection angle of about 0° with at least one substrate normal of the substrate surface, the layer system has a reflectivity for electromagnetic radiation of R≥15% for at least one wavelength range between about 680 nm and about 1100 nm, and has a reflectivity for electromagnetic radiation of R≤5% for at least one wavelength range between about 400 nm and about 680 nm.

21 Claims, 10 Drawing Sheets

(51) Int. Cl.
*G02B 5/20* (2006.01)
*G02B 5/26* (2006.01)
*G02C 7/10* (2006.01)

(58) Field of Classification Search
CPC .......... G02B 1/116; G02B 1/118; G02B 1/12; G02B 1/14; G02B 1/16; G02B 1/18; G02B 5/00; G02B 5/003; G02B 5/20; G02B 5/201; G02B 5/203; G02B 5/204; G02B 5/208; G02B 5/22; G02B 5/226; G02B 5/23; G02B 5/24; G02B 5/26; G02B 5/28; G02B 5/281; G02B 5/282; G02B 5/283; G02B 5/286
USPC .................................. 359/350–361, 577–598
See application file for complete search history.

(56) References Cited

U.S. PATENT DOCUMENTS

| | | | | |
|---|---|---|---|---|
| 10,031,349 | B2 * | 7/2018 | Takahashi | G02C 7/104 |
| 10,082,679 | B2 * | 9/2018 | Gloege | G02C 7/107 |
| 2015/0293284 | A1 | 10/2015 | Tatemura | |

FOREIGN PATENT DOCUMENTS

| | | | |
|---|---|---|---|
| EP | 3702830 | A1 | 9/2020 |
| WO | 2016110339 | A1 | 7/2016 |
| WO | 2021023774 | A1 | 2/2021 |

* cited by examiner

| | | |
|---|---|---|
| [L* = 4.74; C* = 2.81; h* = 195. 14; Rv = 0.524; Rv' = 0.771] | AOI = 0.000 | $S_4$ |
| [L* = 4.84; C* = 2.02; h* = 317.65; Rv = 0 535· Rv' = 0.779] | AOI = 15.000° | $S_3$ |
| [L* = 7.37; C* = 21.36; h* = 195. 14; Rv = 0.817; Rv' = 0.85] | AOI = 30.000° | $S_2$ |
| [L* = 18.81; C* = 41.22; h* = 10.69; 14; Rv = 0.524; Rv' = 1.367] | AOI = 45.000° | $S_1$ |

Source of Fig. 8a), 8b) und 8c): Publication PerkinElmer „Gerichtete Transmission/Reflexion“

| | 0° | 15° | 30° | 45° |
|---|---|---|---|---|
| L* | 4.7 | 4.8 | 7.4 | 18.8 |
| C* | 2.8 | 2.0 | 21.4 | 41.2 |
| h[°] | 195.1 | 317.7 | 356.9 | 10.7 |
| Rv[%] | 0.52 | 0.54 | 0.82 | 2.7 |
| Rv'[%] | 0.77 | 0.78 | 0.85 | 1.4 |
| RM_380-780[%] | 8.0 | 8.7 | 11.4 | 16.7 |
| RM_780-1150[%] | 35.8 | 34.4 | 30.3 | 23.6 |

Fig. 9

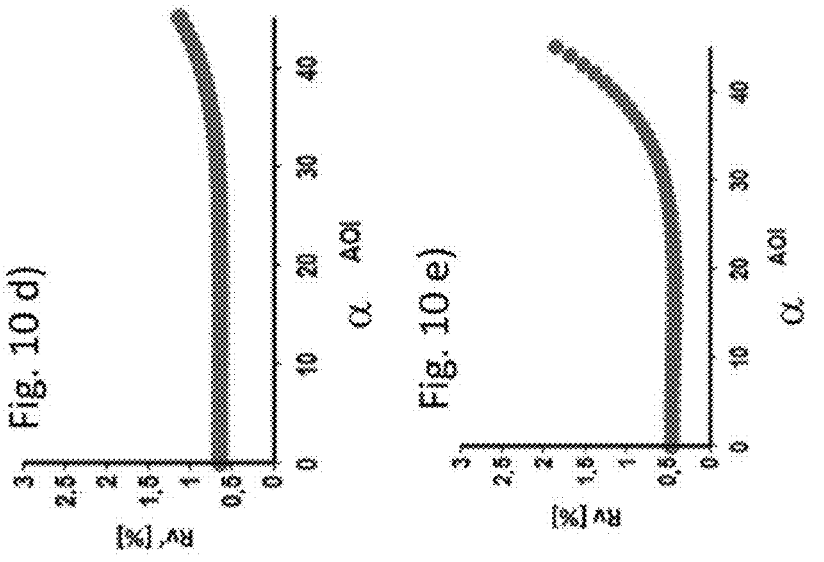
Fig. 10 d)
Fig. 10 e)
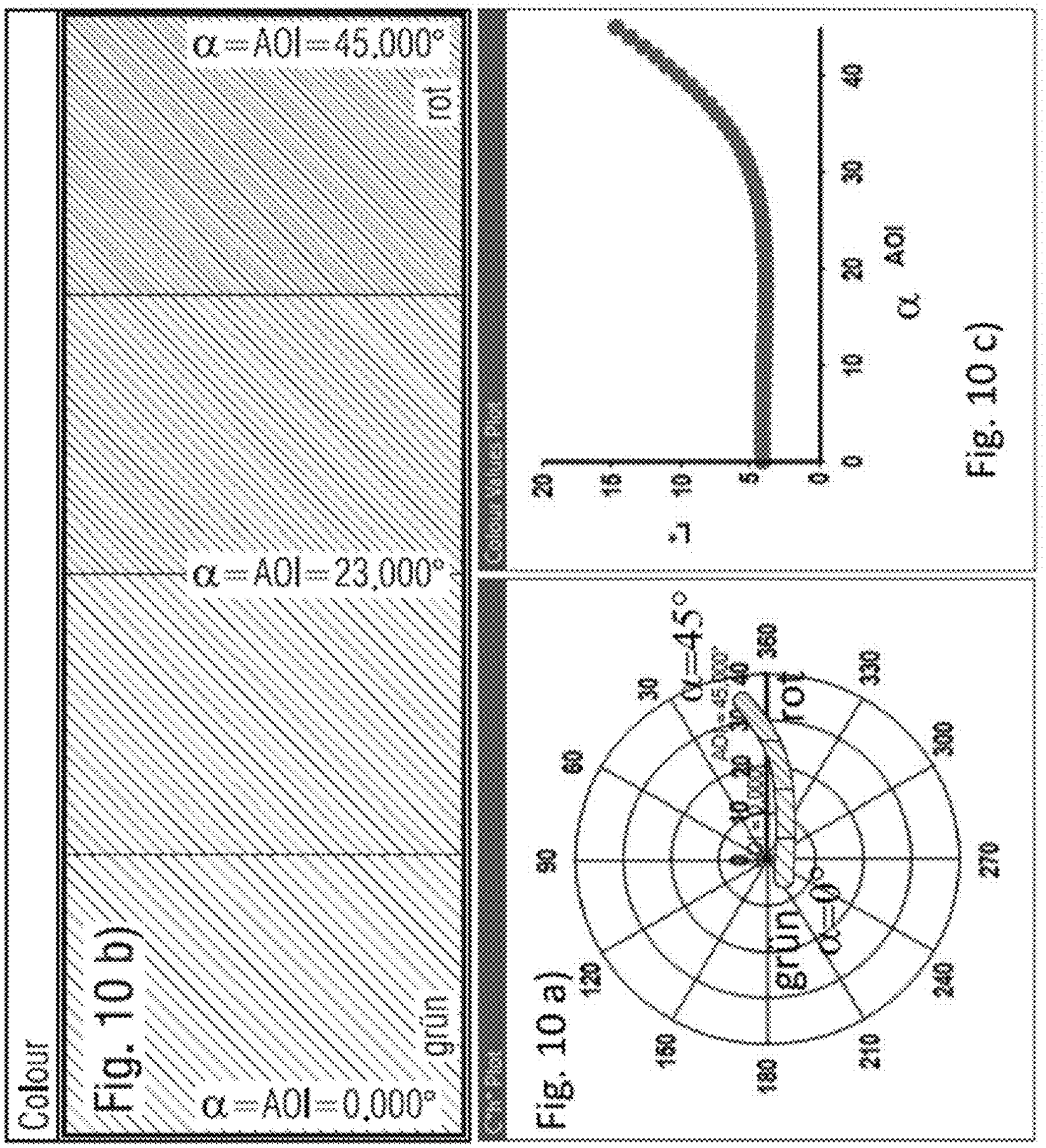
Fig. 10 a)
Fig. 10 b)
Fig. 10 c)

ANTI-REFLECTIVE COATING HAVING IR PROTECTION AND MIRRORING AT HIGHER ANGLES OF INCIDENCE

TECHNICAL FIELD

The invention relates to a layer system, a spectacle lens with a layer system, and a method for producing a layer system, which is used in optical elements such as lenses, in particular for spectacle lenses, for example.

Furthermore, the invention can also be used for glass panes, in particular for display glasses to protect screens or displays in the mobile communications and computer sectors.

The invention can also be used for glass panes, in particular for the coating of vehicle windows.

BACKGROUND

Transparent optical systems having UV mirror coating are known. For example, UV absorbers to protect the eyes from harmful UV radiation are often integrated into known materials for spectacle lenses. An alternative to this UV protection implemented in the material can be a coating on a lens, which also provides effective protection against UV radiation. For example, such a layer system is known from WO 2016/110339 A1. High reflectivity values are achieved substantially in the spectral UV wavelength range (UV range), in particular over 60%, with the same systems substantially being relatively transparent to electromagnetic radiation or light in the visible and infrared ranges. Reflection in the UV range has the advantage, particularly for spectacle lenses and/or vehicle windows, that a user can be protected or shielded from harmful UV radiation. However, there continues to be a need for improved systems to protect a user from harmful electromagnetic radiation.

SUMMARY

According to one aspect, it is the object to provide a system and a method for producing the system, which enables improved protection of a user from certain electromagnetic radiation.

The object is achieved by the layer system and the method for producing the layer system according to the independent claims. Advantageous embodiments are the subject of the dependent claims.

A layer system with infrared mirror coating according to one aspect, comprising

- a substrate base, for example a spectacle lens or a vehicle window or a window pane, in particular a building window pane, comprising a substrate sheet with a substrate surface, through which electromagnetic radiation can at least partially propagate or pass through; and
- a plurality of low-refraction layer sheets and a plurality of high-refraction layer sheets, wherein a high-refraction or a layer sheet with a high-refraction property and a low-refraction layer sheet or a layer sheet with a low-refraction property are arranged alternately at or on the substrate surface in such a way that the layer system at a detection angle of about 0° with at least one substrate normal of the substrate surface
- has a reflectivity for electromagnetic radiation or light of about R≥15%, in particular of about R≥25%, and particularly R≥50% for at least a wavelength range between about 680 nm and about 1100 nm; and

- has a reflectivity for electromagnetic radiation or light of about R≤5%, in particular of about R≥2.5%, and particularly preferably of about R≥0.5% for at least a wavelength range between about 400 nm and about 680 nm, so that the layer system is substantially translucent or transparent to electromagnetic radiation in at least a portion of the visible range.

Here and also with regard to other information, the term "about" refers to a deviation of +/−10%, preferably of +/−5%, particularly preferably of +/−3%, and in particular of +/−1% of the respective specified value(s), in particular the target value and/or the limit value.

A detection angle of about 0° means measuring at an angle that is as close as possible to 0°, depending on the measuring apparatus. In other words, it is known to those skilled in the art that a measurement at a detection angle of 0° is not carried out exactly at 0°, but will deviate from 0° due to measurement technology.

The term "glass/lens" and/or "spectacle lens" can refer to a corresponding glass/lens and/or spectacle lens on the basis of $SiO_2$ and/or made of plastic.

Particularly preferably, a layer system with infrared mirror coating comprises

- a substrate base, for example a spectacle lens or a vehicle window or a window pane, in particular a building window pane, comprising a substrate sheet with a substrate surface, through which electromagnetic radiation can at least partially propagate or pass through; and
- a plurality of low-refraction layer sheets and a plurality of high-refraction layer sheets, wherein a high-refraction or a layer sheet with a high-refraction property and a low-refraction layer sheet or a layer sheet with a low-refraction property are arranged alternately at or on the substrate surface in such a way that the layer system at a detection angle of about 0° within the limits of measurement accuracy with at least one substrate normal of the substrate surface
- has a reflectivity for electromagnetic radiation or light of about R≥15%, in particular of about R≥25%, and particularly R≥50% for at least a wavelength range between about 680 nm and about 1100 nm; and
- has a reflectivity for electromagnetic radiation or light of about R≤5%, in particular of about R≥2.5%, and particularly preferably of about R≥0.5% for at least a wavelength range between about 400 nm and about 680 nm, so that the layer system is substantially translucent or transparent to electromagnetic radiation in at least a portion of the visible range.

Unless otherwise stated, refractive index specifications always refer to a reference wavelength of 550 nm.

The wavelength range between about 680 nm and about 1100 nm includes parts of the infrared range, in particular the near-infrared range, and parts of the visible range, in particular the spectral red shades of the visible range.

The wavelength range between about 300 nm and about 680 nm includes parts of the UV range, in particular the UV-A and UV-B ranges, and parts of the visible range, in particular violet shades. It may also include blue shades in the visible range.

The layer system according to the above aspect has the surprising effect that it has a high level of mirror coating for wavelengths from or greater than about 700 nm. In particular, a high level of mirror coating is achieved for a wavelength range in the near-infrared range, in particular in the IR-A range. At the same time, a particularly low level of mirror coating, i.e. a particularly high level of anti-reflective coating, i.e. permeability or transparency for electromagnetic radiation in the visible range, is achieved. The layer system therefore proves to be particularly favorable for the coating of optical elements, for example for the coating of optical lenses, such as in particular spectacle lenses and/or window glasses and/or vehicle windows, which on the one hand are to be transparent to light in a wide visible range and on the other hand are to have high reflectivity for at least a part of higher wavelengths.

An optical element coated with a layer system according to the above aspect has the advantage of at least partially shielding a person, in particular the eyes of a person using the optical element, from electromagnetic radiation in the IR-A range while at the same time improving the aesthetic appearance of the optical element in the visible range. The damaging effect of electromagnetic radiation, especially in the infrared spectral range, is described in detail in the guideline "Inkohärente sichtbare und infrarote Strahlung von künstlichen Quellen" (Fachverband für Strahlschutz e.V., document no. FS-2018-176-AKNIR, May 28, 2018). Thus, according to the present aspect, users of such an optical element can advantageously be substantially protected from the influence of harmful electromagnetic radiation using the layer system located thereon. In particular, electromagnetic radiation in the IR-A range occurs in road traffic, for example. The increased use of night vision assistance systems in road traffic, for example, leads to increased exposure to electromagnetic radiation in the IR-A range, which-without appropriate filtering-hits the human eye almost unhindered.

Due to the high reflection of radiation in the IR-A range and at the same time high transmittance of the layer system for visible radiation, it is advantageous to apply the layer system according to the present aspect to vehicle windows, for example to vehicle windshield panes and/or rear windows panes, and/or to spectacle lenses so that the eyes of a user, for example a car driver and/or a person wearing spectacles, can be largely protected from harmful IR radiation. At the same time, a particularly good view of visible electromagnetic radiation is guaranteed, so that a user's vision is substantially not impaired. The coating described is particularly suitable as a coating on the convex side or front side or, in the usual position of wear, the side of a spectacle lens facing the incident light.

There is also an advantage in the aesthetic appearance of the layer system, for example when it comes to a spectacle lens. In particular, a person wearing spectacles can identify the protective effect of the spectacles in the infrared range simply by looking at the outer surface of the spectacle lens at the appropriate angle through the red reflection and, if applicable, distinguish it from conventional spectacles.

Preferably, the plurality of low-refraction layer sheets is a system of substantially homogeneous low-refraction layer sheets and the plurality of high-refraction layer sheets is a system of substantially homogeneous high-refraction layer sheets. In other words, a specific material or a specific material mixture is preferably used for a system of homogeneous low-refraction layer sheets, with another specific material or a specific material mixture being used for a system of homogeneous high-refraction layer sheets. In particular, $SiO_2$ is used as the material for the low-refraction layer sheets and $ZrO_2$ is preferably used as the material for the high-refraction layer sheets. In particular, two specific materials are used for the system of homogeneous low-refraction layer sheets and homogeneous high-refraction layer sheets, but this does not exclude the possibility of other materials being used in the layer system as well.

Preferably, one of the low-refraction layer sheets includes $SiO_2$. The low-refraction layer sheet can consist entirely of $SiO_2$. In this case, this low-refraction layer sheet should, in combination with the other layer sheets, have an anti-reflective effect in the visible wavelength range. In other words, a low-refraction layer sheet including $SiO_2$ and integrated into the arrangement of alternating low-refraction and high-refraction layer sheets allows a special anti-reflective effect in the visible wavelength range. In particular, a low-refraction layer sheet including $SiO_2$ and applied to a high-refraction layer sheet has an anti-reflective effect.

In particular, the low-refraction layer sheet located furthest away from the substrate includes $SiO_2$ in order to achieve the anti-reflective effect. The low-refraction layer sheet, which includes $SiO_2$ and is located furthest away from the substrate, particularly has an anti-reflective effect because it is applied to a high-refraction layer sheet.

The layer system thus has a low-refraction layer sheet with a layer sheet thickness of in particular about 70 nm to about 77 nm, wherein the low-refraction layer sheet preferably includes a quartz, i.e. $SiO_2$ and, in combination with the other layer sheets being alternately layered low-refraction and high-refraction layer sheets, is suitable to make the layer system anti-reflective in the visible wavelength range. As already mentioned, this low-refraction layer sheet is the low-refraction layer sheet located furthest away from the substrate or the uppermost low-refraction layer sheet. The low-refraction layer sheet located furthest away from the substrate is applied to a high-refraction layer sheet and, in particular, therefore has an anti-reflective effect.

Further functional layer sheets can be arranged on the last or upper or outermost low-refraction layer sheet, such as a care layer sheet, which can serve in particular to prevent adhesion of contaminants.

Preferably, the last optically active layer sheet is a low-refraction layer sheet.

As already explained above, optically active layer sheets are those layer sheets that significantly influence or determine the optical properties of the layer system or the optical element on which the layer system is arranged, in particular transmission and/or reflection of the layer system or the optical element. Functional layer sheets, which are preferably not optically active, differ from that since they do not significantly influence or specify the optical properties of the layer system or the optical element on which the layer system is arranged, in particular the transmission and/or reflection of the layer system or the optical element.

The layer system is equipped with a last or uppermost substantially optically active layer sheet, the layer sheet being one of the low-refraction layer sheets and preferably consisting of $SiO_2$. This structure proves to be particularly advantageous in terms of the anti-reflective effect, at least partially in the visible wavelength range. $SiO_2$ in amorphous form, for example, has a refractive index n of about 1.46 (measured at a wavelength of about 550 nm, which corresponds to the center of eye sensitivity). Alternatively, low-refraction $MgF_2$ having a refractive index n of about 1.38 could also be used here, but this material can only be applied at high temperatures of about 300° C.

The layer sheets are preferably arranged or applied or deposited at or on the substrate surface in such a way that the layer system at a detection angle of about 0° with the substrate normal of the substrate surface for at least a wavelength range between about 280 nm and about 400 nm has a reflectivity for electromagnetic radiation of about $R \geq 10\%$, in particular about $R \geq 20\%$, and particularly preferably about $R \geq 60\%$.

This layer system is particularly suitable for protection against potentially harmful electromagnetic radiation in the UV, especially in the UV-A and UV-B range. This UV protection is particularly advantageous in order to protect a user from such harmful effects, particularly because of the carcinogenic effect of UV radiation on human tissue.

In addition to the IR protection mentioned, the coating also has a high level of UV protection. An optical element and/or window glass coated with this layer system can therefore not only protect a user from harmful infrared radiation, but also from harmful UV radiation while at the same time having a high level of transmission properties in the visible wavelength range.

This UV protection also protects the glass/lens material, the applied coatings, and the dyes contained in the glass/lens from the potentially harmful effects of UV radiation.

The layer system is therefore particularly suitable for sports, mountaineering and ski goggles, as the exposure to UV and IR radiation is particularly high under the influence of solar radiation, especially at high altitudes and in snow.

This layer system is also well suited for coating display glasses to protect displays that need to be protected from harmful electromagnetic radiation. In this case, a user is not on the side of the layer system that is opposite to the incident light, but on the side of the incident light. The display or screen, for example the LED screen, is usually located on the side opposite to the incident light.

Another field of application is equipment in nautical science, for example navigation instruments on board a ship or a boat and/or sail and/or hull elements of a boat, since the radiation on the water is particularly high due to the reflection of sunlight on the water surface, and the corresponding material experiences a great deal of strain.

Optionally, the layer sheets are arranged or applied or deposited at or on the substrate surface in such a way that the layer system at a detection angle of about 0° with the substrate normal of the substrate surface for at least a wavelength range between about 480 nm and about 580 nm has a reflectivity maximum of electromagnetic radiation of about R≤5%, in particular of about R≤3%, and particularly preferably of about R≤1%.

The reflectivity maximum between about 480 nm and about 580 nm can be determined in such a way that the absolute maximum value is determined compared to local or surrounding or adjacent reflectivity values and there corresponds to the said reflectivity maximum. Alternatively, a difference in reflectivity between the local maximum and the local minima on both sides, i.e. at higher and lower wavelengths, can be determined. In particular, in this case the local minima on both sides of the local maximum are about the same value, in particular with a reflectivity of about 0%. If this is not the case and there is an increase in reflectivity depending on the wavelength, the average difference in reflectivity between the local maximum and the local minima on both sides can also be used, or a baseline can be considered.

When a surface is made anti-reflective in the visible wavelength range, a comparatively low reflection maximum often occurs for shades of green between about 480 nm and about 580 nm. This maximum stands out from neighboring reflection values by a maximum of 1%, so that in this range, in particular for green shades, there is a comparatively low reflection property, so that the transmission properties are substantially particularly high for a broad wavelength range of visible light and shades are reflected on the layer sheets of the layer system only to a very small extent. In other words, the layer system substantially does not distort a viewer's impression on the side of the coated object facing away from the incident light in the visible range.

According to one embodiment, the layer sheets are arranged and/or applied and/or deposited at or on the substrate surface in such a way that the layer system at a detection angle of about 0° with the substrate normal of the substrate surface for at least a wavelength range in the blue light range, i.e. between about 420 nm and about 500 nm, has a reflectivity maximum of electromagnetic radiation of about R≤5%, in particular of about R≤3%, and particularly preferably of about R≤1%.

The reflectivity maximum between about 420 nm and about 500 nm can be determined in such a way that the absolute maximum value is determined compared to local and/or surrounding and/or adjacent reflectivity values and there corresponds to said reflectivity maximum. Alternatively, a difference in reflectivity between the local maximum and the local minima on both sides, i.e. at higher and lower wavelengths, can be determined. In particular, in this case the local minima on both sides of the local maximum are about the same value, in particular with a reflectivity of about 0%. If this is not the case and there is an increase in reflectivity depending on the wavelength, the average difference in reflectivity between the local maximum and the local minima on both sides can also be used, or a baseline can be considered.

When a surface is made anti-reflective in the visible wavelength range, a comparatively low reflection maximum often occurs for shades of blue between about 420 nm and about 500 nm. This maximum stands out from neighboring reflection values by a maximum of 1%, so that in this range, in particular for blue shades, there is a comparatively low reflection property, so that the transmission properties are substantially particularly high for a broad wavelength range of visible light and shades are reflected on the layer sheets of the layer system only to a very small extent. In other words, the layer system substantially does not distort a viewer's impression on the side of the coated object facing away from the incident light in the visible range.

Preferably, the plurality of high-refraction layer sheets comprise at least one of the materials: $Ta_2O_5$, $TiO_2$, $Ti_xO_y$, $ZrO_2$, $Al_2O_3$, $Nd_2O_5$, $Pr_2O_3$, $PrTiO_3$, $La_2O_3$, $Nb_2O_5$, $Y_2O_3$, $HfO_2$, ITO (Indium Tin Oxide), ZnS, $Si_3N_4$, MgO, $CeO_2$ and their modifications, in particular their other oxidation states.

Particularly preferred high-refraction layer sheets comprise $ZrO_2$ and/or $Ta_2O_5$. In particular, a high-refraction layer sheet can comprise a single one of the materials mentioned here. Alternatively, a high-refraction layer sheet can comprise several of the materials mentioned, namely as a mixture or as a combination of compound materials or composite materials, each of which comprises at least one of the materials mentioned. A layer system can comprise several high-refraction layer sheets of the same material or, alternatively, at least two high-refraction layer sheets of different materials.

The materials mentioned are particularly suitable because they can be deposited or applied to the substrate surface and/or to layer sheets using physical vapor deposition and/or chemical vapor deposition and/or sputtering.

Particularly preferably, the plurality of low-refraction layer sheets comprise at least one of the following materials: $MgF_2$, SiO, $SiO_2$, silanes, siloxanes, a mixture comprising $SiO_2$ and $Al_2O_3$, in particular a mixture with at least about 80 percent by weight of $SiO_2$, preferably a mixture with at least about 90 percent by weight of $SiO_2$.

Particularly preferred low-refraction layer sheets consist of $SiO_2$. In particular, a low-refraction layer sheet can consist of a single one of the materials mentioned here. Alternatively, a low-refraction layer sheet can include several of the above-mentioned materials, namely as a mixture or as a combination of compound materials or composite materials, each of which including at least one of the materials. A layer system can include several low-refraction layer sheets of the same material or, alternatively, at least two low-refraction layer sheets of different materials.

The materials mentioned are particularly suitable because they can be deposited or applied to the substrate surface and/or to layer sheets using physical vapor deposition and/or chemical vapor deposition and/or sputtering.

Preferably, the layer sheets, starting from the substrate base, arranged in the following order comprise:

- a first high-refraction layer sheet;
- a first low-refraction layer sheet;
- a second high-refraction layer;
- a second low-refraction layer sheet;
- a third high-refraction layer;
- a third low-refraction layer sheet;
- a fourth high-refraction layer; and
- a fourth low-refraction layer sheet, in particular a $SiO_2$ i.e. quartz layer, which is suitable to make the layer system anti-reflective at least partially in the visible range.

Preferably, the low-refraction layer sheets homogeneously have a low-refraction material and/or the high-refraction layer sheets homogeneously have a high-refraction material, and wherein preferably the high-refraction material does not have or is not a material with the highest refraction or a material with a very high refraction.

Preferably, the layer sheets, starting from the substrate base, arranged in the following order comprise:

- a first high-refraction layer sheet with a layer sheet thickness of at least about 118 nm;
- a first low-refraction layer sheet with a layer sheet thickness of at least about 135 nm;
- a second high-refraction layer sheet with a layer sheet thickness of at least about 70 nm;
- a second low-refraction layer sheet with a layer sheet thickness of at least about 80 nm;
- a third high-refraction layer sheet with a layer sheet thickness of at least about 5 nm;
- a third low-refraction layer sheet with a layer sheet thickness of at least about 35 nm;
- a fourth high-refraction layer sheet with a layer sheet thickness of at least about 55 nm; and
- a fourth low-refraction layer sheet with a layer sheet thickness of at least about 60 nm.

In other words, a preferred layer system, starting from the substrate base, arranged in the following order comprises:

- a first layer sheet comprising one of the high-refraction layer sheets, namely the first high-refraction layer sheet, and having a layer sheet thickness of at least about 118 nm;
- a second layer sheet comprising one of the low-refraction layer sheets, namely the first low-refraction layer sheet, and having a layer sheet thickness of at least about 135 nm;
- a third layer sheet comprising one of the high-refraction layer sheets, namely the second high-refraction layer sheet, and having a layer sheet thickness of at least about 70 nm;
- a fourth layer sheet comprising one of the low-refraction layer sheets, namely the second low-refraction layer sheet, and having a layer sheet thickness of at least about 80 nm;
- a fifth layer sheet comprising one of the high-refraction layer sheets, namely the third high-refraction layer sheet, and having a layer sheet thickness of at least about 5 nm;
- a sixth layer sheet comprising one of the low-refraction layer sheets, namely the third low-refraction layer sheet, and having a layer sheet thickness of at least about 35 nm;
- a seventh layer sheet comprising one of the high-refraction layer sheets, namely the fourth high-refraction layer sheet, and having a layer sheet thickness of at least about 55 nm; and
- a last substantially optically active layer sheet comprising one of the low-refraction layer sheets, namely the fourth low-refraction layer sheet, and having a layer sheet thickness of at least about 60 nm.

Particularly preferably, the layer sheets, starting from the substrate base, arranged in the following order comprise:

- a first high-refraction layer sheet with a layer sheet thickness of at most about 130 nm;
- a first low-refraction layer sheet with a layer sheet thickness of at most about 160 nm;
- a second high-refraction layer sheet with a layer sheet thickness of at most about 120 nm;
- a second low-refraction layer sheet having a layer sheet thickness of at most about 105 nm;
- a third high-refraction layer sheet with a layer sheet thickness of at most about 15 nm;
- a third low-refraction layer sheet with a layer sheet thickness of at most about 45 nm;
- a fourth high-refraction layer sheet with a layer sheet thickness of at most about 80 nm; and
- a fourth low-refraction layer sheet with a layer sheet thickness of at most about 80 nm.

In other words, a preferred layer system comprises the layer sheets, starting from the substrate base, arranged in the following order:

- a layer sheet comprising one of the high-refraction layer sheets, namely the first high-refraction layer sheet, and having a layer sheet thickness of at most about 130 nm;
- a layer sheet comprising one of the low-refraction layer sheets, namely the first low-refraction layer sheet, and having a layer sheet thickness of at most about 160 nm;
- a layer sheet comprising one of the high-refraction layer sheets, namely the second high-refraction layer sheet, and having a layer sheet thickness of at most about 120 nm;
- a layer sheet comprising one of the low-refraction layer sheets, namely the second low-refraction layer sheet, and having a layer sheet thickness of at most about 105 nm;
- a layer sheet which comprising one of the high-refraction layer sheets, namely the third high-refraction layer sheet, and having a layer sheet thickness of at most about 15 nm;
- a layer sheet comprising one of the low-refraction layer sheets, namely the third low-refraction layer sheet, and having a layer sheet thickness of at most about 45 nm;
- a layer sheet comprising one of the high-refraction layer sheets, namely the fourth high-refraction layer sheet, and having a layer sheet thickness of at most about 80 nm; and a last substantially optically active layer sheet comprising one of the low-refraction layer sheets, namely the fourth low-refraction layer sheet, and having a layer sheet thickness of at most about 80 nm.

Particularly preferably, the layer sheets, starting from the substrate base, arranged in the following order comprise:

a high-refraction layer sheet with a layer sheet thickness of about 121.5 nm;

a low-refraction layer sheet with a layer sheet thickness of about 151 nm;

a high-refraction layer sheet with a layer sheet thickness of about 106.2 nm;

a low-refraction layer sheet with a layer sheet thickness of about 95.2 nm;

a high-refraction layer sheet with a layer sheet thickness of about 12.1 nm;

a low-refraction layer sheet with a layer sheet thickness of about 42.0 nm;

a high-refraction layer sheet with a layer sheet thickness of about 59.6 nm; and a fourth low-refraction layer sheet with a layer sheet thickness of about 74.9 nm.

In other words, a layer system preferably comprises the layer sheets, starting from the substrate base, arranged in the following order:

a layer sheet comprising one of the high-refraction layer sheets, in particular $ZrO_2$, and having a layer sheet thickness of about 121.5 nm;

a layer sheet comprising one of the low-refraction layer sheets, in particular $SiO_2$, and having a layer sheet thickness of about 151 nm;

a layer sheet comprising one of the high-refraction layer sheets, in particular $ZrO_2$, and having a layer sheet thickness of about 106.2 nm;

a layer sheet comprising one of the low-refraction layer sheets, in particular $SiO_2$, and having a layer sheet thickness of about 95.2 nm;

a layer sheet comprising one of the high-refraction layer sheets, in particular $ZrO_2$, and having a layer sheet thickness of about 12.1 nm;

a layer sheet comprising one of the low-refraction layer sheets, in particular $SiO_2$, and having a layer sheet thickness of about 42 nm;

a layer sheet comprising one of the high-refraction layer sheets, in particular $ZrO_2$, and having a layer sheet thickness of about 59.6 nm; and a last substantially optically active layer sheet comprising one of the low-refraction layer sheets, and in particular $SiO_2$, and having a layer sheet thickness of about 75 nm, in particular of about 74.9 nm.

Advantageously, for layer systems of the above-mentioned embodiments, there is a maximum reflectivity for electromagnetic radiation between about 680 nm and about 1100 nm, the position, height and width of which is particularly favorable for the reflection of IR-A radiation. At the same time, the transmission of visible light is particularly favorable, so that a high proportion of the visible light can propagate or pass through the layer system and, for example in the case of a spectacle lens, appears as visible to the spectacles wearer and a good view can be guaranteed. The maximum between about 680 nm and about 1100 nm is such that, after weighting according to ICNIRP guidelines from 2013, as much of the potentially damaging IR-A radiation as possible is reflected and the spectral half-width is particularly favorable since a sufficiently wide spectral range of the IR-A radiation can be reflected sufficiently strongly. The result of this present embodiment is a particularly favorable IR protection, i.e. a particularly good shielding from electromagnetic radiation, particularly in the IR-A range.

According to the present description, it has been found that the above advantageous effect occurs in particular when the layer system has the above-mentioned layer order with the above-mentioned layer thicknesses and/or materials. It may also be possible for the above advantageous effect to occur at least partially if two or three of the high-refraction layer sheets and/or two or three low-refraction layer sheets are formed, as stated above.

In addition to the IR protection mentioned, the coating also has a high level of UV protection. This UV protection also protects a user from potentially harmful electromagnetic radiation. In addition, the substrate, in particular a glass/lens material, applied coatings and/or dyes contained in the glass/lens can be protected from UV radiation.

Preferably, the layer system comprises a functional layer sheet, which can consist in particular of $Al_2O_3$; and/or preferably the layer system further comprises a care layer sheet.

Particularly preferably, the layer system further comprises a functional layer sheet, which can consist in particular of $Al_2O_3$ and can have a layer sheet thickness of at least about 8 nm and at most about 11 nm; and/or particularly preferably the layer system further comprises a care layer sheet with a layer sheet thickness of at least about 1 nm and at most about 20 nm. The functional layer sheet can additionally or alternatively also comprise or consist of ITO and/or another similar material.

In other words, the layer system according to one embodiment further comprises the following optional layer sheets a functional layer sheet, in particular made of $Al_2O_3$, which preferably has a layer sheet thickness of at least about 8 nm and at most about 11 nm; The fourth low-refraction layer sheet, in particular made of $SiO_2$ and with a preferred layer sheet thickness of at least about 70 nm and at most about 77 nm, is attached to this functional layer sheet made of $Al_2O_3$; and/or a care layer sheet, in particular with fluorine-containing molecules and preferably with a layer sheet thickness of at least about 1 nm and at most about 20 nm.

In other words, according to a preferred embodiment, the layer system has ten layer sheets, the first seven layer sheets being the alternately arranged first to fourth high-refraction layer sheets and first to third low-refraction layer sheets. The functional layer sheet made of $Al_2O_3$ is arranged on the fourth high-refraction layer sheet. The fourth low-refraction layer sheet is arranged on the functional layer sheet made of $Al_2O_3$. The care layer sheet is arranged on the fourth low-refraction layer sheet. This layer system can be applied directly to a substrate in successive application steps, for example. Alternatively, it is also possible for one or more layer sheets, e.g. comprising an adhesion promoter, a hard lacquer, etc., to be arranged between the layer system and the substrate.

The care layer sheet can be applied to the last optically relevant layer sheet of the layer system and contain fluorine-containing molecules. The function of this care layer sheet usually represents an improved care property, with properties such as water and oil repellent functions with a surface energy of typically less than 15 mN/m.

Preferably, the substrate base further comprises:

a protective layer sheet, which can also be referred to as a hard coat layer or scratch protection layer and in particular has a lacquer layer or an organic layer, with a layer sheet thickness of at least about 500 nm and at most about 5 μm; and preferred an adhesion layer sheet, which in particular has low-refraction metal oxides, chromium, silanes and/or siloxanes, with a layer sheet thickness of at least about 1 nm and at most about 20 nm.

A further layer, which can be called a primer lacquer layer, is preferably applied between the scratch protection layer and the substrate. This primer lacquer layer has the effect of an adhesion promoter and/or increased impact resistance.

In other words, the substrate base preferably also comprises the following layer sheets:

a layer sheet comprising a protective layer sheet or a hard coat layer sheet and preferably having a layer sheet thickness of at least about 500 nm and at most about 5 μm; and preferably a layer sheet comprising an adhesion layer sheet, in particular comprising low-refraction metal oxides, chromium, silanes and/or siloxanes, and preferably having a layer sheet thickness of at least about 1 nm and at most about 20 nm.

A protective layer sheet has the advantage that it can protect the substrate from external influences and thus makes the entire system particularly resistant. The protective layer sheet can in particular comprise uretane-based paints and/or acetate-based paints as primers and/or buffer paints (applied before the protective layer) to improve adhesion and for increased impact resistance.

Preferably, a primer lacquer layer can be arranged as an adhesion promoter and in particular to improve the impact resistance between the substrate and the protective layer or scratch protection layer.

An adhesion layer sheet allows or facilitates the application of the layer sheets of the layer system. For example, such an adhesion layer sheet can comprise an element such as chromium or adhesive molecules, for example with silane compounds. The adhesion layer sheet has the effect of an agent that creates a reliable chemical bond to the substrate surface and in particular chemically binds the material of the first layer to be applied.

Accordingly, such layer systems can therefore, in addition to the optically relevant layer sheets that substantially comprise the high and low-refraction layer sheets, also comprise further functional layer sheets, care layer sheets, protective layer sheets and/or adhesion layer sheets, which are substantially not relevant for the optical properties. Alternatively, however, an optically relevant layer sheet can also be provided with functions, for example by applying a mixture of materials.

Preferably, the substrate base comprises an optical element, in particular a lens and preferably a spectacle lens.

Due to the high level of mirroring coating properties in the infrared range and the resulting high glare protection in the IR-A range as well as the high light transmission in the visible wavelength range, the layer system is particularly suitable as a coating for spectacles for road users. Due to its high level of IR-A protection, the coating is also particularly suitable for optical elements in vehicles, such as windshield panes.

Optionally, the substrate base comprises a pane, in particular a vehicle window and preferably a windshield pane and/or a rear window pane and/or a mirror and/or a side window of a vehicle.

This preferred layer system has high scotopic and/or mesopic vision properties over a large angular range or incidence angle range of the incident light and can thus support a driver with night vision and/or twilight vision. Scotopic vision, also twilight vision or rod vision, relates to the perception of light at low brightness, with the transition zone at dusk corresponding to the mesopic range or twilight vision.

In particular, electromagnetic radiation in the IR-A range occurs, for example in road traffic. The increased use of night vision assistance systems in road traffic also leads to increased exposure to electromagnetic radiation in the IR-A range, for example, which-without appropriate filtering-hits the human eye almost unhindered.

Due to the suitable transmittance of visible electromagnetic radiation and at the same time a high level of reflection of electromagnetic radiation in the IR-A range, it is advantageous to apply this preferred layer system to vehicle windows, for example on vehicle windshield panes, so that the eyes of a user, for example a vehicle driver, are protected from harmful IR Radiation can be protected as much as possible, while at the same time having favorable transmission properties in the visible range. In other words, a windshield pane coated in this way allows high visibility in the visible spectral wavelength range while at the same time providing high protection against IR radiation and preferably against UV radiation.

The coating with the layer system according to one of the embodiments mentioned can not only be used for spectacle lenses and/or vehicle windows, but can also be applied as a coating to many types of optical articles. The coating would also be conceivable on a display glass as a display protection, for example. The display can be arranged in a vehicle. Alternatively or in addition, the display can be a display of a conventional electronic device having a display. The display lying under such a coated display glass is given a high level of protection against IR-A radiation (heat protection) and the viewer sees their privacy protected, as viewers from the side see a red reflection at higher angles of incidence due to the mirror coating effect, whereas the actual viewer, due to the excellent anti-reflective coating, can view their display at the usual viewing angle ($\alpha \neq 0°$ with a high level of transmission properties.

Preferably, the reflectivity of electromagnetic radiation in a wavelength range between about 560 nm and about 1000 nm, preferably between about 570 nm and about 920 nm, and particularly preferably between about 580 nm and about 900 nm, at least for a section of the wavelength range has a slope/gradient of the reflectivity between about 20% per 100 nm and about 80% per 100 nm, preferably between about 30% per 100 nm and about 60% per 100 nm, and particularly preferably between about 35% per 100 nm and about 45% per 100 nm.

In other words, the plot of reflectivity versus wavelength has a positive reflectivity change or slope near a maximum for viewing angles between about 0° and about 60°, in particular for viewing angles between about 0° and about 45°, namely in particular for a wavelength range between about 580 nm and about 900 nm, in which the comparatively high reflectivity slope occurs. The slope in this range is in particular about 40% per 100 nm. The wavelength range of the comparatively high slope can vary, for example, depending on the viewing angle.

A section can correspond to a smaller wavelength range of the respective wavelength ranges mentioned above. For a reflectivity determined at a viewing angle of about 0°, a section of the wavelength range between about 560 nm and about 1000 nm can correspond, for example, to a smaller wavelength range between about 600 nm and about 870 nm. In this smaller wavelength range between about 600 nm and about 870 nm, the comparatively high reflectivity slope, for example of about 40% per 100 nm, occurs substantially constantly. It may also be the case that the wavelength range of the comparatively high reflectivity slope has a saddle point and/or an edge, i.e. substantially no constant high reflectivity slope of a fixed value. For example, all values for the reflectivity slope in a wavelength range between about 600 nm and about 870 nm may be between about 25% per 100 nm and about 45% per 100 nm, such that a slight increase, a strong increase, and a flattened increase near the maximum of the wavelength range mentioned can occur.

A high mirror coating effect is characterized in particular by a particularly high increase in reflectivity within a wavelength range. On the one hand, this is due to the high transparency in the visible wavelength range and, on the other hand, to the high reflectivity in the infrared wavelength range. Substantially, for the limit range, it holds that a particularly high increase in reflectivity depending on the wavelength between about 560 nm and about 1000 nm results in a particularly good ratio of transparency in the visible range to shielding through reflectivity in the infrared range. Ideally, the reflectivity is particularly low in the visible wavelength range. Preferably, the layer system is at least partially almost 100% transparent in the visible wavelength range and particularly opaque in the infrared range, at least for an angular range at which the surface is viewed. The slope of the reflectivity is at least about 30% per 100 nm, at least for a partial range, in particular at least about 40% per 100 nm, and preferably at least about 50% per 100 nm.

With regard to the wavelength, the course of the reflectivity, which is recorded at an angle of 45°, preferably has an increase in an edge to high values from about 580 nm and the increase or the reflectivity slope in the range between about 600 nm and about 680 nm has a value of about 15% to about 50% per 100 nm, in particular from about 20% per 100 nm to about 40% per 100 nm.

At a viewing angle $\alpha$ of about 45°, a viewer can easily determine whether the layer system has IR protection. For example, before using a spectacle lens, a spectacle wearer can easily determine whether their choice of spectacles is one with IR protection. In addition to this practical effect, the aesthetic appearance of spectacles with such mirrored lenses is also advantageous.

Preferably, the reflectivity starting from a wavelength of about 630 nm, in particular at about 680 nm for a viewing angle $\alpha$ of about 45°

- is between about 10% and 20%, in particular about 15% higher than at a viewing angle $\alpha$ of about 30°;
- is between about 20% and 30%, in particular about 25% higher than at a viewing angle $\alpha$ of about 15°; and
- is between about 23% and 33%, in particular about 27% higher than at a viewing angle $\alpha$ of about 0°.

Preferably, the reflectivity at a viewing angle $\alpha$ of about 45° and a wavelength of

- about 630 nm has a value between about 10% and about 20%, in particular between about 13% and about 17%;
- about 680 nm has a value between about 30% and about 40%, in particular between about 33% and about 39%; and
- about 730 nm has a value between about 43% and about 53%, in particular between about 45% and about 50%.

At a viewing angle $\alpha$ of about 45°, a viewer can easily determine whether the layer system has IR protection in accordance with the previous preferred features. In particular, before using a lens spectacle, a spectacle wearer can determine, in particular by looking at about 45°, whether the selected spectacles are spectacles with IR protection.

One aspect relates to a spectacle lens, wherein a layer system with infrared mirror coating according to the preceding aspect is arranged on the object side of the spectacle lens so that the spectacle lens forms the substrate base of the layer system.

The spectacle lens has the object side, which is usually convex, faces the object being viewed and thus faces away from the eye of the spectacle wearer. The opposite side of the spectacle lens forms the eye side of the spectacle lens, which is usually concave, faces the eye of the spectacle wearer and faces away from the object being viewed.

Since the layer system is arranged on the object side of the spectacle lens according to the aspect described above, all statements regarding the layer system also relate to the spectacle lens and vice versa.

According to one embodiment, the spectacle lens on its side of the eye has a reflectivity for electromagnetic radiation of $R \leq 5\%$, preferably $R \leq 3\%$, and in particular $R \leq 1\%$, for a wavelength range of about 400 nm to about 1100 nm.

Preferably, the reflectivity is consistently less than about 5% or 3% or 1% for the entire wavelength range from about 400 nm to about 1100 nm. Alternatively, at least the average reflectivity over this wavelength range can be less than about 5% or 3% or 1%.

This reflectivity can be caused by the substrate of the spectacle lens on the side of the eye, for example.

This reflectivity can be caused by a layer system formed on the spectacle lens's side of the eye, for example.

The low reflectivity on the side of the eye means that light impinging the lens from behind is hardly or practically not reflected at all into the eye. This reduces annoying light reflections and/or increases wearing comfort when using the spectacle lens. Further advantageously, the eye is protected from harmful UV and/or IR radiation, which could possibly be reflected into the eye from the eye side of the lens.

A method for producing a layer system with infrared mirror coating according to one aspect

- providing a substrate base comprising a substrate sheet with a substrate surface; and
- arranging, on the substrate surface, a plurality of low-refraction layer sheets and a plurality of high-refraction layer sheets, wherein a layer sheet with a high-refraction property and a layer sheet with a low-refraction property are arranged alternately in such a way that the layer system at a detection angle of about 0° with a substrate normal of the substrate surface
- has a reflectivity for electromagnetic radiation of about $R \geq 15\%$ for at least a wavelength range between about 680 nm and about 1100 nm; and
- has a reflectivity for electromagnetic radiation of about $R \leq 5\%$ for at least a wavelength range between about 400 nm and about 680 nm.

The layer system shows a particularly high or even optimized anti-reflective coating in the visible range. The layer system can be applied to a substrate base using common coating systems. The result of the anti-reflective coating over almost the entire visible spectral range, as well as the mirror coating in the IR-A range and partially in the visible limit range, especially for red shades, is directly visible. The effect can be verified by the fact that a viewer perceives a red shade reflection when viewing straight from the top and/or when viewing at an angle from the side of the layer system facing the incident light. However, the reflections of the invisible spectral components in the IR-A and UV range are substantially not perceived. A corresponding detector can detect such spectral components from one or more viewing angles.

Furthermore, the layer system does not necessarily require materials with a very high refraction or even the highest refraction. A refractive index of n less than about 1.55 is understood to be particularly of low refraction, for example a value of about 1.38. A refractive index n between about 1.55 and about 1.8, in particular between about 1.55 and about 1.7, is assumed to be of medium refraction. In particular, a refractive index of n between about 1.8 and about 2.1 is understood to be of high refraction. A refractive index of n greater than or equal to 2.4, in particular greater than or equal to 2.5, is understood to be of very high refraction or highest refraction. Materials with a very high refraction often contain titanium.

The method for producing the layer system, i.e. the coating of the substrate base with the layer system, can be carried out using conventional coating methods, in particular using physical vapor deposition (PVD) and/or using chemical vapor deposition (CVD) and does not necessarily depend on methods using plasma/ion coating. However, the coating method using plasma/ion coating can be used as well.

It is also not excluded that layers or layer sheets be applied using alternative coating methods. In addition to PVD and/or CVD, layers of material can alternatively or additionally be deposited using sputtering processes, electroplating techniques, spin coating or chemical coatings in accordance with Langmuir absorption. For example, an additional protective layer, e.g. a lacquer, can be deposited or applied to the layer system using spin coating.

Preferably, the method comprises arranging the plurality of low-refraction layer sheets and the plurality of high-refraction layer sheets according to the above-mentioned preferred order and preferred layer thicknesses.

The advantageous properties of the layer system are achieved in particular by the layer arrangement, without the need for any process-related measures. In particular, reflectivity is not a parameter or process parameter that requires control, especially during the production of the layer system. In other words, the optical properties, in particular the reflectivity of the layer system, can be considered an intrinsic or inherent material property of the layer system. The reflectivity is therefore not included as a criterion in a production process of the layer system, i.e. in a coating process. The coating is not carried out with the aim of achieving the above-mentioned reflectivities, but rather with the aim of arranging the plurality of low-refraction layer sheets and the plurality of high-reflection layer sheets in accordance with the above-mentioned preferred order and preferred layer thicknesses.

The layer system is in particular an interferometric multi-sheet layer system in which the spectral reflectivity between the visible range and IR-A range is specifically controlled. The layer system allows a high level of anti-reflective coating in the visible range, while it achieves a high level of mirror coating, particularly in the IR-A range.

The visible range is described by the parameters Rv, Rv', L*, C*, h* and by RM_(380-780 nm) in the visible range and RM_(780-1150 nm) in the IR-A range as well as by appropriate calculation of the reflection values in the IR-A range with the thermal weighting function described according to ICNIRP guidelines 2013.

The parameters L*, C*, h* refer in particular to the luminosity, saturation and the color value, respectively, in the color wheel in polar coordinates (DIN 11664-1/2). Rv and Rv' refer in particular to the visual light reflectance (DIN 13666), where Rv relates to daytime vision and Rv' relates to twilight vision. RM refers to the averaged reflectance value. In particular, RM_(380-780 nm) refers to the reflectivity in the visible range, specifically for the range between 380 nm and 780 nm, and RM_(780-1150 nm) refers to the reflectivity in the infrared range between 780 nm and 1150 nm. The reflection value is averaged in particular by averaging all reflection values over all wavelengths in the corresponding wavelength range. The averaged reflection is calculated according to DIN EN ISO 13666:2019, with the integration limits being adjusted accordingly.

The layer system can in particular show characteristic features regarding the position, height, and width of the IR maximum. In particular, the layer system allows, after weighting according to the ICNIRP guidelines from 2013, the highest possible proportion of the damaging IR-A radiation to be reflected and its spectral half-width to be improved or even optimized. However, it is not of great importance to extend the IR maximum of spectral reflectivity to wavelength ranges above 1200 nm. In other words, the reflection behavior of the layer system is of little or no interest for wavelengths greater than 1200 nm. In addition to the IR protection mentioned, the coating preferably has a high level of UV protection. This UV protection can also protect the glass/lens material, the applied coatings, and the dyes contained in the glass/lens.

In other words, an advantageous effect lies in the combination of a favorable anti-reflective coating in the visible range with the IR protection described, since on the one hand a user can perceive the light in a broad visible spectral range and at the same time can be protected from harmful IR-A radiation and preferably also substantially from harmful UV radiation. In other words, the layer system allows the transmission of a large part of the visible light, whereas a large part of the harmful invisible light, namely a high proportion of the IR-A light and preferably also a high proportion of the UV light, is reflected and is not transmitted through the layer system.

The effect of mirror coating in the IR range and anti-reflective coating in the visible range becomes “visible” to a viewer from the outside when they are viewing at a minimum angle, for example with spectacles in a position outside the usual position of wear of the spectacles: When viewing straight from the top, i.e. at a viewing angle $\alpha \leq 30°$, a viewer perceives a high anti-reflective effect from the outside or from the front, namely based on only a negligible residual reflection of a green shade, i.e. for wavelength ranges in which electromagnetic radiation appears green to the viewer. When viewing at an angle $\alpha \geq 30°$, a viewer perceives the protective properties against IR-A radiation, namely through the partially visible mirror coating for red shades.

The high anti-reflective effect is retained up to a certain viewing angle. From this particular viewing angle, the anti-reflective coating turns into a visible red mirror coating, which makes the IR protection clear to the viewer. A specific viewing angle of about 30° substantially corresponds to an angle at which the reflective effect of the layer system becomes particularly visible to a viewer. From this angle onward, the layer system no longer allows a viewer from the outside to “see” behind the layer system, as the mirroring or reflectivity in the visible range reaches a high value. This angle can be varied moderately by changing the layer thicknesses, while maintaining the properties described. As part of the development of the layer, the typical position of wear of the lenses in the frame can be taken into account in order to prevent annoying glare effects for the spectacles wearer due to the red mirror coating being inserted too early.

Some exemplary embodiments will be described in more detail in the following, although the invention is not intended to be limited to the exemplary embodiments described. Further advantages may be associated with specific features according to examples and/or according to embodiments. Individual features described in a particular embodiment can be combined arbitrarily, in particular also with detailed features of another embodiment, provided that they are not mutually exclusive. Furthermore, various features provided together in the exemplary embodiments are not to be construed as limiting the invention.

BRIEF DESCRIPTION OF THE DRAWINGS

FIG. 9 shows a tabular exemplary representation of spectral parameters for four different viewing angles;

FIG. 10*a*) shows an exemplary course of the residual reflex color when varying the viewing angle α from about 0° to about 45°, with the color value being plotted on the color wheel in polar coordinates;

FIG. 10*b*) shows an exemplary course of the residual reflex color when the viewing angle α varies from about 0° to about 45°, with the color value being selected as a color plot against the viewing angle α;

FIG. 10*c*) shows an exemplary plot of the luminosity L* against the viewing angle α;

FIG. 10*d*) shows an exemplary plot of the visual light reflectance Rv' for twilight vision against the viewing angle α; and FIG. 10*e*) shows an exemplary plot of the visual light reflectance Rv for daytime vision against the viewing angle α.

DETAILED DESCRIPTION

Figure 1:
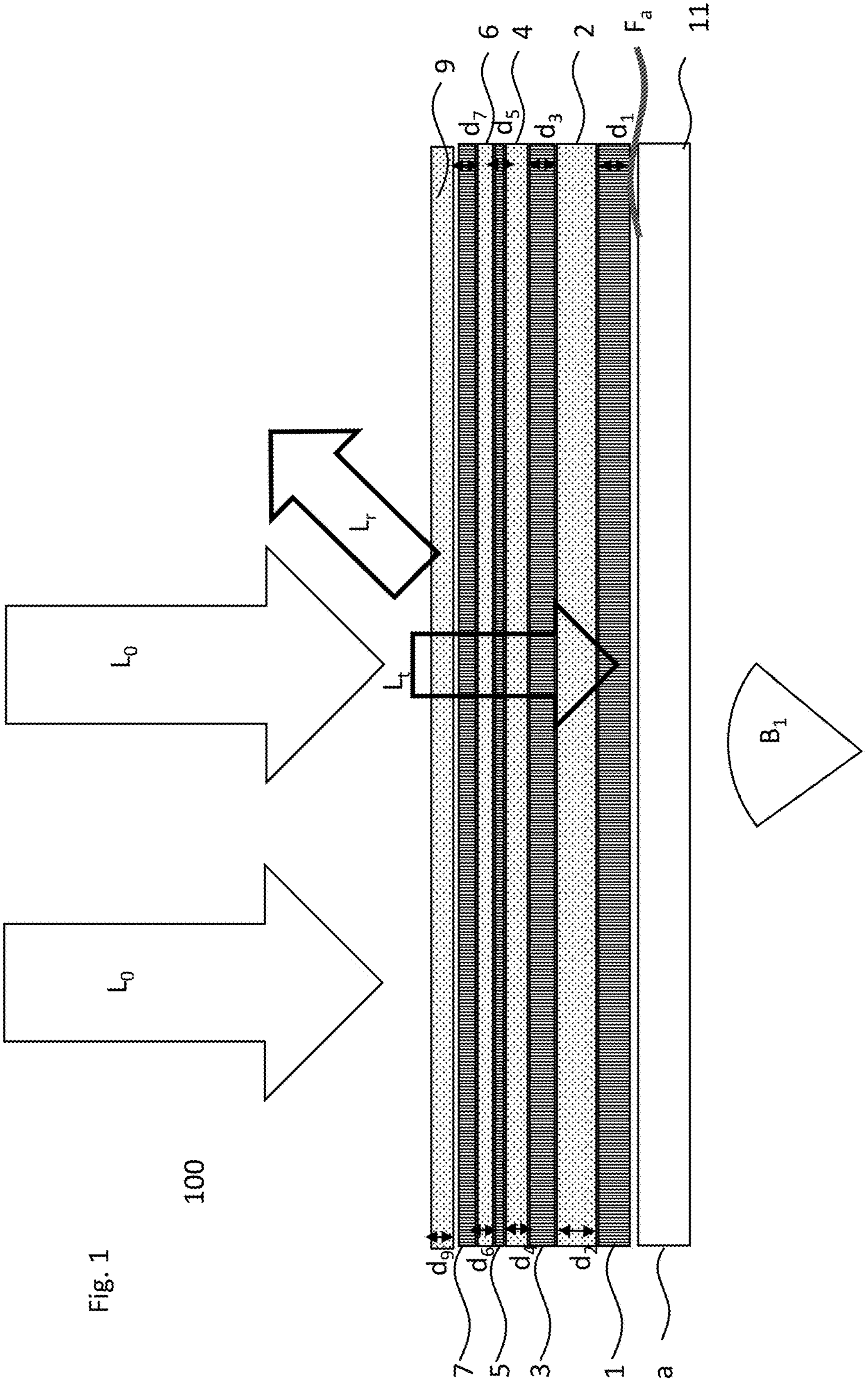
FIG. 1 shows a schematic side view of a layer system according to an embodiment in simplified representation, wherein the substrate base comprises a single substrate sheet.

A detailed description of exemplary embodiments in conjunction with the drawings will be given below:

FIG. 1 shows a schematic side view of a layer system 100 according to an embodiment in highly simplified representation. The layer system 100 comprises a plurality of layer sheets 1-7, 9 and a substrate base 11 with a substrate sheet a. In FIG. 1, the substrate base 11 comprises only one substrate sheet a, on which high-refraction layer sheets 1, 3, 5, 7 and low-refraction layer sheets 2, 4, 6, 9 are arranged alternately/in layers.

The first layer sheet 1 starting from the substrate base 11 is a first high-refraction layer sheet 1, which is arranged on the substrate surface $F_a$ of the substrate sheet a and has a layer sheet thickness $d_1$. The layer sheet thickness $d_1$ preferably has a value between about 90 nm and about 150 nm, in particular between about 110 nm and about 130 nm, and preferably between about 115 nm and about 125 nm.

The second layer sheet 2 starting from the substrate base 11, which is arranged on the first layer sheet 1, is a first low-refraction layer sheet 2 having a layer sheet thickness $d_2$. The layer sheet thickness $d_2$ preferably has a value between about 120 nm and about 180 nm, in particular between about 140 nm and about 160 nm, and preferably between about 145 nm and about 155 nm.

The third layer sheet 3 starting from the substrate base 11, which is arranged on the second layer sheet 2, is a second high-refraction layer sheet having a layer sheet thickness $d_3$. The layer sheet thickness $d_3$ preferably has a value between about 70 nm and about 130 nm, in particular between about 90 nm and about 115 nm, and preferably between about 100 nm and about 110 nm.

The fourth layer sheet 4 starting from the substrate base 11, which is arranged on the third layer sheet 3, is a second low-refraction layer sheet having a layer sheet thickness $d_4$. The layer sheet thickness $d_4$ preferably has a value between about 65 nm and about 125 nm, in particular between about 80 nm and about 110 nm, and preferably between about 90 nm and about 100 nm.

The fifth layer 5 starting from the substrate base 11, which is arranged on the fourth layer 4, is a third high-refraction layer sheet having a layer sheet thickness $d_5$. The layer sheet thickness $d_5$ preferably has a value between about 2 nm and about 20 nm, in particular between about 5 nm and about 15 nm, and preferably between about 11 nm and about 13 nm.

The sixth layer sheet 6 starting from the substrate base 11, which is arranged on the fifth layer sheet 5, is a third low-refraction layer sheet having a layer sheet thickness $d_6$. The layer sheet thickness de preferably has a value between about 20 nm and about 60 nm, in particular between about 35 nm and about 50 nm, and preferably between about 40 nm and about 44 nm.

The seventh layer 7 starting from the substrate base 11, which is arranged on the sixth layer 6, is a fourth high-refraction layer sheet having a layer sheet thickness $d_7$. The layer sheet thickness $d_7$ preferably has a value between about 40 nm and about 80 nm, in particular between about 50 nm and about 70 nm, and preferably between about 55 nm and about 65 nm.

Other layers can also be arranged between the first layer sheet 1 and the substrate sheet a. For example, an adhesion layer sheet can be arranged on the substrate sheet a. A substantially low-refraction layer sheet can also be arranged between the substrate sheet a and the first layer sheet 1.

On the seventh layer sheet 7, a further, fourth low-refraction layer sheet 9, in particular a quartz layer sheet, is arranged. In particular, a functional layer with a specific functionality can be arranged between the seventh layer sheet 7 and the low-refraction layer sheet 9 (not shown here). The last low-refraction layer sheet 9, in cooperation with the other layer sheets, serves in particular for anti-reflective coating in the visible range.

In the present case, the layer sheets 1-7, 9 and the substrate sheet a of the substrate base 11 are shown as planar sheets. Such an embodiment can be advantageous as a highly simplified form of representation for substantially non-planar substrates, such as free-form surfaces of a spectacle lens. This embodiment may also apply to planar substrates, such as substantially flat planar window glasses. Ideally, all layer sheets 1-7, 9 are substantially homogeneous over the entire surface in terms of the respective layer sheet thickness. However, there can also be deviations. In this case, the layer sheet thickness can correspond to a layer sheet thickness averaged over the surface or a maximum layer sheet thickness or a layer sheet thickness at a specific portion of the surface.

The last layer sheet 9 is, as already mentioned above, in particular a low-refraction layer sheet, preferably a $SiO_2$ layer, which is suitable for anti-reflective coating of the layer system, in particular for visible electromagnetic radiation. The layer sheet 9 is particularly preferred in layer systems because of its good anti-reflective properties.

In the general case, a user $B_1$ is in the typical position of wear on the side facing away from the incident light $L_0$, i.e. behind the layer system 100 or on the side facing away from the layer sheets 1-7, 9. In other words, the typical position of wear is characterized by the fact that a user $B_1$ or their eyes are on the side of the layer system 100 that faces away from the incident electromagnetic radiation $L_0$ and the layers 1-7, 9. Thus, a user $B_1$ can be protected from harmful electromagnetic radiation by shielding the radiation through the layer system 100 by reflection. As an exception, however, this does not apply to a normal user of a display protected with the layer system, since the user of a display is usually on the side of the incident light.

At the same time, the layer system 100 allows at least a portion, preferably a high spectral portion, of visible light $L_t$ to pass or pass through the layer system 100 or to propagate through the layer system 100, so that the user $B_1$ is allowed or guaranteed the best possible view through the layer system 100.

The reflectivity R substantially corresponds to the ratio between the intensity $I_r$ of the reflected electromagnetic radiation L, and the intensity $I_0$ of the incident electromagnetic radiation $L_0$. The intensities $I_r$ and $I_0$ can be detected depending on the wavelength, in particular between about 200 nm and 1400 nm, at different angles or viewing angles using one or more light-sensitive detectors.

The term "incident light $L_0$" refers to electromagnetic waves that hit or fall or impinge onto the surface of the layer system at an angle α' of about −90° to about 90°, in particular below about 0°, with the perpendicular or the substrate normal. The incident light $L_0$ thus substantially hits from the side facing the layer sheets onto the top layer of the layer sheets, for example onto the ninth layer sheet 9.

The term "reflected light $L_r$", with regard to the spectrum and intensity, refers to the portion of the incident light $L_0$ that is reflected at the layer sheets, for example at the top layer sheet and/or at one of the other layer sheets below the top layer sheet.

The term "transmitted light $L_t$", with regard to the spectrum and intensity, refers to the portion of the incident light $L_0$ that passes or runs through the layer system and the substrate sheet. Accordingly, the transmitted light $L_t$ is the portion of the incident light $L_0$ that can reach the backside, i.e. the side of the layer system facing away from the layer system.

The reflectivity R is in particular a measure of the mirror coating of an area and/or a surface. Reflectivity can generally also be referred to as degree of reflection, reflectance and/or reflectivity. This variable substantially corresponds to the ratio between reflected intensity or power and incident intensity or power. Reflectivity can be expressed as follows:

$$R = \frac{I_r}{I_0} = \frac{P_r}{P_0}$$

where $I_r$ corresponds to the intensity of reflected light $L_r$ and $I_0$ corresponds to the intensity of incident light $L_0$, and where $P_r$ corresponds to the power of reflected light and $P_0$ corresponds to the power of incident light.

The spectral infrared (IR) range of light substantially corresponds to electromagnetic radiation in the wavelength range from about 780 nm to about 1 mm. The term "infrared range" in this specification refers in particular to the near-infrared (NIR) range between about 780 nm and about 3 μm and, more specifically, the IR-A range between about 780 nm and about 1.4 μm. The electromagnetic radiation in the IR range can also be understood as invisible or invisible light.

The spectral visible or visual (Vis) range of light corresponds to electromagnetic radiation in the wavelength range from about 380 nm to about 780 nm, in particular from about 400 nm to about 750 nm. The term "visible range" in this specification refers in particular to the range of electromagnetic radiation that appears generally and substantially visible to humans. The electromagnetic radiation in the visible range can also be understood as visible light.

The spectral ultraviolet (UV) range of light corresponds to electromagnetic radiation in the wavelength range from about 100 nm to about 380 nm. The term "UV range" in this specification refers in particular to the UV-A and UV-B range, with the UV range A range being between about 315 nm and about 380 nm and the UV-B range being between about 280 nm and about 315 nm. However, the UV-C range can also be included, wherein it is between about 100 nm and about 280 nm. Electromagnetic radiation in the UV range can also be understood as invisible or invisible light.

In general, the term "range" refers in particular to the wavelength range of electromagnetic radiation.

Figure 2:
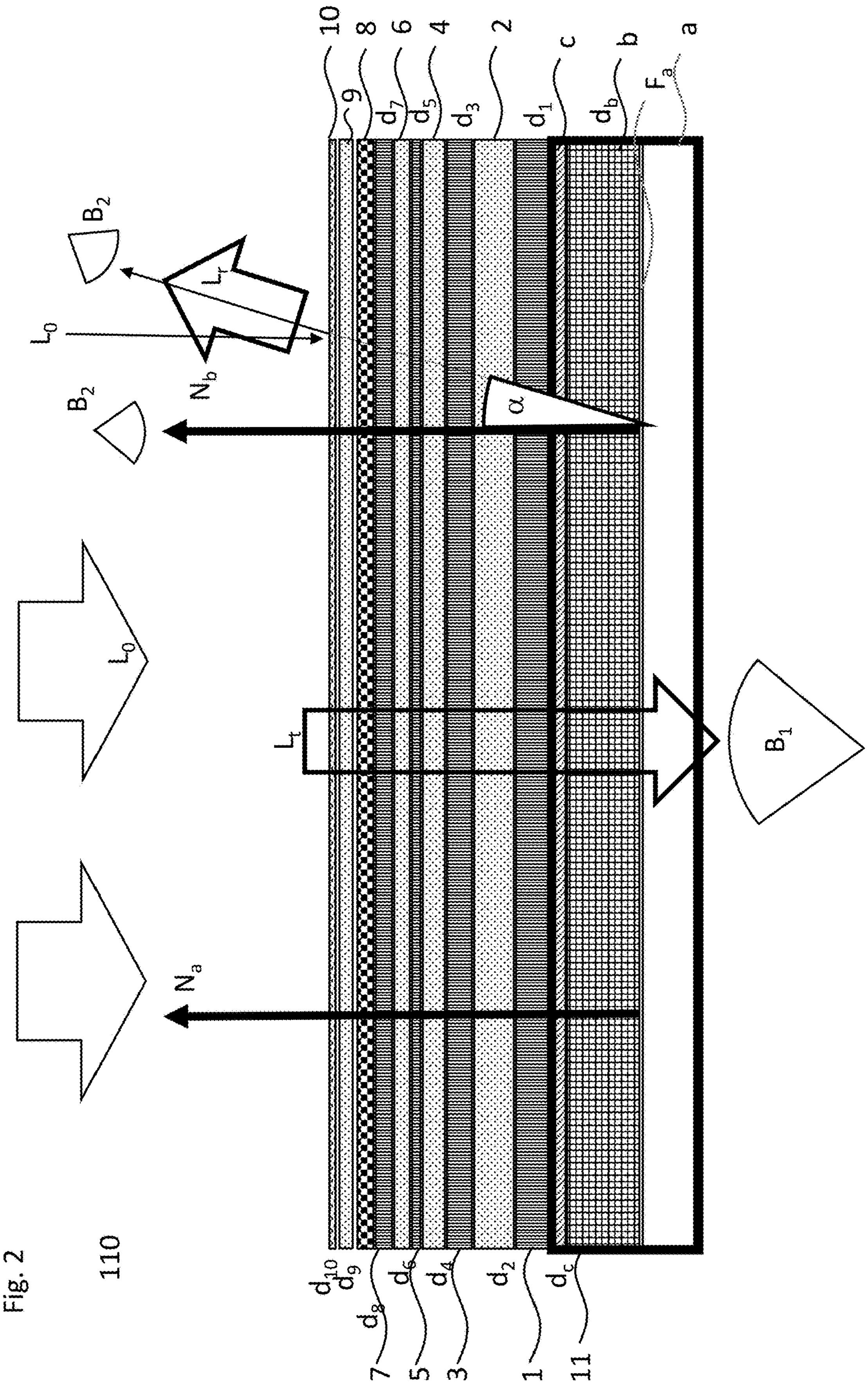
FIG. 2 shows a schematic side view of a layer system according to an embodiment in a simplified representation, wherein the substrate base comprises a substrate sheet and additional layer sheets including a hard coating and an adhesion layer sheet.

FIG. 2 is a schematic side view of a layer system 110 according to an embodiment comprising a substrate base 11 with a substrate sheet a and additional layer sheets b, c. Furthermore, the layer system 110 comprises a plurality of layer sheets 1-10, which are arranged on the substrate sheet. Substantially, the layer system 110 shown in FIG. 2 comprises the individual elements, in particular the layer sheets 1-7, 9, which are exemplarily and schematically illustrated in the layer system 100 of FIG. 1, as well as further layer sheets b, c, 8 and 10. The layer sheets 1-10, b, c shown in FIG. 2 and the substrate sheet a are substantially formed as planar sheets.

In the present case, the substrate base 11 comprises, in addition to the substrate sheet a, substantially two further layer sheets b, c with respective layer sheet thicknesses $d_b$ and $d_c$, for example a hard coating, which is preferably applied directly to the substrate surface $F_a$ of the substrate sheet a and, for example, an adhesion layer sheet that is preferably applied directly to the hard coating. The layer sheet b is in particular a protective layer sheet, which is also a hard coating or hard coat layer and can, for example, comprise a hard lacquer particularly suitable for having scratch protection. Alternatively or in addition, the layer system can have a primer lacquer that is designed to ensure high impact resistance and thus high stability. This is particularly advantageous for spectacle lenses or windshield panes.

The first layer 1, which here also corresponds to the first high-refraction layer sheet, is applied to the adhesion layer sheet c. The adhesion layer sheet c has the effect of ensuring reliable adhesion or adhesive force between the hard coating or hard layer sheet b and the first layer sheet 1, so that the first layer sheet 1 with all the other layer sheets 2-10 permanently adheres to the substrate base 11 or the last layer c of the substrate base, namely the adhesion layer sheet. The adhesive force is based in particular on a chemical bond between the adhesion layer sheet c and the first layer sheet 1. In the event that a material is applied to a substrate surface, in particular to a relatively smooth substrate surface, it may happen that this material does not adhere sufficiently to the substrate surface and detaches from it under minimal influences. For this reason, an adhesion layer sheet c is advantageous or required to prevent the layer sheets 1-10 or parts of the layer system 110 from detaching from the substrate base 11.

In other words, the adhesion layer sheet c can serve for better adhesion directly on the substrate surface $F_a$ or on the applied hard layer b. This adhesion layer sheet c can, for example, comprise substoichiometric low-refraction metal oxides, chromium, silanes and also siloxanes.

The layer system 110 comprises the three top layer sheets 8-10, each with three layer sheet thicknesses $d_8$, $d_9$, and $d_{10}$.

The eighth layer sheet 8, which is arranged on the seventh layer sheet 7, is preferably a functional, i.e. a substantially optically non-active layer sheet, for example comprising $Al_2O_3$. The ninth layer sheet 9, which is arranged on the eighth layer sheet 8, is a fourth low-refraction layer sheet. The tenth layer sheet 10, which is arranged on the ninth layer sheet 9, can preferably be a care layer sheet (clean effect layer sheet).

A viewer $B_2$ of the layer system 110, who views it from the side of the incident light $L_0$, can substantially perceive reflections of the reflected light $L_r$ at certain angles α, provided that they are in the visible spectral range. Alternatively, the position of a viewer $B_2$ can also be occupied by a light-sensitive detector. The viewer $B_2$ or detector can adopt different viewing angles α. The angle α is enclosed by the substrate normal $N_a$ or $N_b$ with a propagation direction of the reflected light $L_r$, which falls into the eye of the viewer $B_2$ or onto a sensor field of the detector. At about 0°, the viewer $B_2$ of the layer system 110 substantially looks onto the layer system 110 directly from “above” parallel to the substrate normal $N_a$ or $N_b$, i.e. perpendicularly, from the side of the layer sheets 1-10, i.e. from the side of the incident light $L_0$ and the light source that produces it.

The substrate normals $N_a$ or $N_b$ are characterized in that they form a right angle on all sides of the surface with the planar surface or a substantially planar surface portion or an about planar surface portion. In other words, the substrate normals $N_a$ or $N_b$ are each a perpendicular of the respective surface portion. The substrate normals $N_a$ or $N_b$ are parallel to one another in the present case, since the substrate sheet a has a substantially planar substrate surface $F_a$ and therefore different surface portions each have surface normals that substantially have the same direction and are therefore substantially parallel to one another.

This case is a highly simplified case that can apply, for example, to planar window glasses and/or display glasses for protecting displays, but not to typical optical lenses with non-planar surfaces. In the present case, the viewing angle α is defined by the substrate sheet a or the substrate surface $F_a$, since in reality the substrate sheet a represents a significantly thicker layer compared to the layer sheets 1-10, b, c and the individual layer sheets 1-10, b, c are substantially arranged on the substrate surface $F_a$ in such a way that they substantially recreate it, since they have substantially homogeneous layer sheet thicknesses. Thus, a substrate normal $N_a$ or $N_b$ of the substrate surface $F_a$ substantially corresponds to the respective normals of the layer sheets surfaces of the layer sheets 1-10, b, c. Thus, for the sake of simplicity, the substrate normal $N_a$ or $N_b$ can be assumed to be only defined by the substrate surface $F_a$. To characterize the reflectivity, the viewing angle α is in particular between about 0° and about 45°. In this area, at least partial reflections of visible light L, can also be viewed or recorded.

In contrast to the viewer $B_2$, who perceives reflected components $L_r$ of the incident light $L_0$, the user $B_1$ on the other side of the layer system 110 sees non-reflected, i.e. transmitted, components of the incident light $L_0$, which correspond to at least part of the transmitted component $L_t$ of the incident light $L_0$.

In particular, the exemplary and simplified layer system 110 of FIG. 2, which substantially does not have uneven surfaces, can be used to quantify, test or demonstrate the technical effect (as a proof-of-principle), since in this case the viewing angles α are comparatively simple are to be determined. A prototype or a sample item may correspond to this embodiment.

Figure 3:
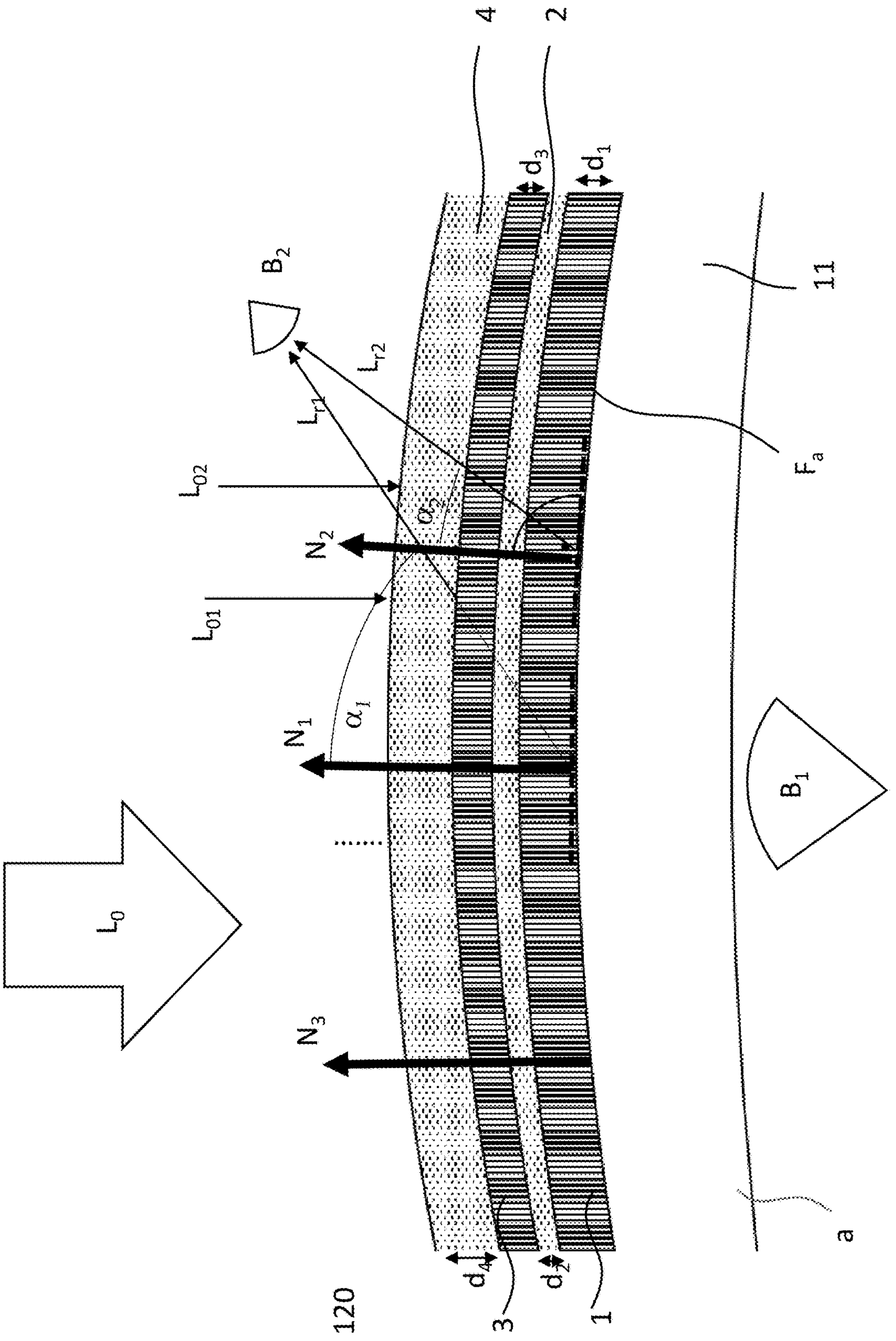
FIG. 3 shows a schematic side view of a layer system according to an embodiment in a simplified representation, wherein the substrate sheet has a convex-concave shape.

FIG. 3 is a schematic side view of a layer system 120 according to an embodiment with a substrate base 11 comprising a substrate sheet a and with a plurality of layer sheets 1-4. In contrast to the layer systems 100 and 110 in FIG. 1 and FIG. 2, the substrate sheet a of the layer system 120 in FIG. 3 has a convex-concave shape, with the substrate surface $F_a$ corresponding to a convex surface. In this case it can be, for example, an optical lens. In the present case, the substrate sheet a is, for example, coated with a plurality of layer sheets 1-4 comprising four layer sheets 1, 2, 3, 4. In particular, the layer sheet arrangement of FIG. 1 or FIG. 2 can be applied. Although the layer system has a convex shape, the individual layer sheets can have a substantially constant layer thickness or only a slight change in layer thickness. This is particularly true if the layer thickness is small compared to the radius of curvature.

The first layer sheet 1 can preferably be a first high-refraction layer sheet with a layer sheet thickness of $d_1$. The second layer sheet 2 can preferably be a first low-refraction layer sheet with a layer sheet thickness of $d_2$. The third layer 3 can preferably be a second high-refraction layer sheet with a layer sheet thickness of $d_3$. The fourth layer 4 can preferably be a second low-refraction layer sheet with a layer sheet thickness of $d_4$. As indicated in FIG. 3, further layer sheets can be arranged on the fourth layer sheet 4, namely those that have already been described in FIGS. 1 and 2. In particular, the layer systems shown in FIGS. 1 and 2 can be designed in the shape shown in FIG. 3, for example as a lens shape.

In the present case, the layer sheet thicknesses $d_1$, $d_2$, $d_3$, $d_4$ are not shown homogeneously over the substrate surface $F_a$. In the exemplary present case, the layer thicknesses $d_1$, $d_2$, $d_3$, $d_4$ in the vicinity of the central axis each have a substantially maximum layer sheet thickness, which proceeds to thinner layer sheet thicknesses toward the edge of the substrate sheet. The central axis substantially coincides with the substrate normal $N_1$ in the center or in the middle of the substrate surface $F_a$.

However, in many preferred cases, the layer sheet thicknesses $d_1$, $d_2$, $d_3$, $d_4$ can also be designed to be substantially homogeneous, at least for partial portions of the substrate surface $F_a$. In other words, the layer sheet thicknesses can preferably be designed such that they have the same layer sheet thickness everywhere on the substrate surface $F_a$.

In the present case, the exemplarily shown substrate normals $N_1$, $N_2$, $N_3$, which are perpendicular to the substrate surface $F_a$, are not parallel to one another. According to a particular embodiment of the invention, the substrate normals $N_1$, $N_2$, $N_3$ are not parallel to one another, since the substrate sheet a and the layer sheets 1-4 in preferred cases substantially deviate from a planar surface, i.e. have a curvature, for example. This is the case, for example, if the substrate sheet a is an optical lens, in particular a spectacle lens. If the substrate sheet a is a window glass, the substrate sheet a and the layer sheets can each have substantially planar surfaces. Alternatively, non-planar substrate sheets a can also be used for window glasses, especially for vehicle windows, which often have curvatures.

A viewer $B_2$ on the side of the incident light $L_0$ or on the side of the majority of layer sheets 1-4 can, unlike in the case of a planar surface, perceive visible light $L_r$ reflected from a non-planar surface from different viewing angles $\alpha$1 and $\alpha$2 without changing their position. Analogously, a photodetector can detect electromagnetic radiation from different viewing angles $\alpha$1 and $\alpha$2 without having to be moved and/or rotated. As a result, different wavelengths arrive at the eye or detector from different angles. In FIG. 3, this is shown by the indicated rays $L_{01}$ and $L_{02}$, which enclose angles $\alpha$1 and $\alpha$2 with normals $N_1$, and $N_2$, respectively, which are not parallel to one another due to the curvature. A planar substrate without curvature is generally more suitable for isolated observation and examination of the spectrally-resolved reflectivity for different viewing angles $\alpha$1 and $\alpha$2.

Figure 4:
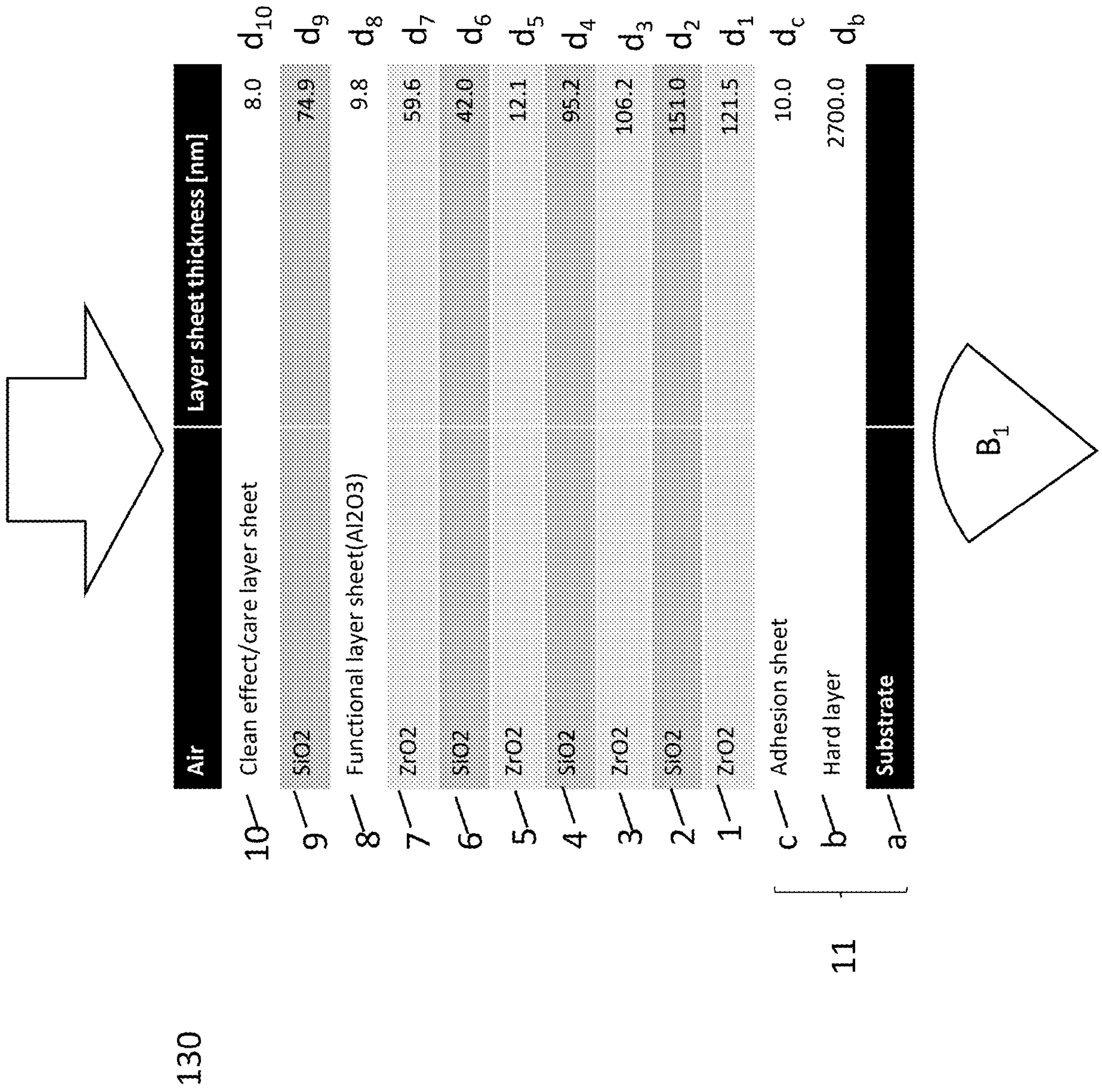
FIG. 4 shows a tabular representation of a layer system according to an embodiment.

FIG. 4 is a tabular representation of a layer system 130 according to an embodiment comprising a plurality of layer sheets 1-10 and a substrate base 11 with a substrate sheet a and further layer sheets b, c.

The first layer sheet 1 starting from the substrate base 11 is a first high-refraction layer sheet comprising $ZrO_2$, which is arranged on the substrate base 11 and has a layer sheet thickness $d_1$ of about 121.5 nm.

The second layer sheet 2 starting from the substrate base 11, which is arranged on the first layer sheet 1, is a first low-refraction layer sheet comprising $SiO_2$ and having a layer sheet thickness $d_2$ of about 151.0 nm.

The third layer sheet 3 starting from the substrate base 11, which is arranged on the second layer sheet 2, is a second high-refraction layer sheet comprising $ZrO_2$ and having a layer sheet thickness $d_3$ of about 106.2 nm.

The fourth layer 4 starting from the substrate base 11, which is arranged on the third layer 3, is a second low-refraction layer sheet comprising $SiO_2$ and having a layer sheet thickness $d_4$ of about 95.2 nm.

The fifth layer 5 starting from the substrate base 11, which is arranged on the fourth layer 4, is a third high-refraction layer sheet comprising $ZrO_2$ and having a layer sheet thickness $d_5$ of about 12.1 nm.

The sixth layer sheet 6 starting from the substrate base 11, which is arranged on the fifth layer sheet 5, is a third low-refraction layer sheet comprising $SiO_2$ and having a layer sheet thickness de of about 42.0 nm.

The seventh layer 7 starting from the substrate base 11, which is arranged on the sixth layer 6, is a fourth high-refraction layer sheet comprising $ZrO_2$ and having a layer sheet thickness $d_7$ of about 59.6 nm.

The eighth layer sheet 8 starting from the substrate base 11, which is arranged on the seventh layer sheet 7, is a functional layer sheet comprising $Al_2O_3$ and having a layer sheet thickness $d_8$ of about 9.8 nm.

The ninth layer sheet 9 starting from the substrate base 11, which is arranged on the eighth layer sheet 8, is a fourth low-refraction layer sheet comprising $SiO_2$ and having a layer sheet thickness $d_9$ of about 74.9 nm.

The tenth layer 10 starting from the substrate base 11, which is arranged on the ninth layer 9, is a care layer sheet, for example comprising fluorine-containing molecules, which has a layer sheet thickness $d_{10}$ of about 8 nm. The tenth layer sheet 10 is the top layer sheet in the layer system 130, which is arranged furthest away from the substrate base.

In the present layer system 130, the substrate base 11 comprises, in addition to the substrate sheet a, also an exemplary hard layer b with an exemplary layer sheet thickness $d_b$ of about 2700 nm and an exemplary adhesion layer c with an exemplary layer sheet thickness $d_c$ of about 10 nm.

According to one or more embodiments, one or more layer sheet thicknesses $d_{1-10}$, b, c can each deviate by about 10%, in particular by about 5%, from the value specified above, i.e. be up to 10% thicker or thinner, in particular up to 5% thicker or thinner.

A layer system according to one embodiment can also only comprise the layer sheets 1 to 7 and in particular the ninth layer sheet 9 and can do without the tenth layer sheet 10, for example.

The hard layer b can, for example, also have a significantly thinner or significantly thicker layer sheet thickness $d_b$. Alternatively, the hard layer b can also be dispensed with completely, particularly in the preferred case that the hard layer b does not contribute to the optical properties of the layer system 130.

The hard layer b can be formed as an organic lacquer layer or as an inorganic layer such as $SiO_2$, if necessary also with possible additives. Before arranging the layer system, the substrate surface $F_a$ can be conditioned using a plasma treatment. The aim of the plasma treatment can be activation or functionalization.

The layer system 110 of FIG. 2 can, for example, have the specification of the tabular representation of the layer system 130 of FIG. 4. The layer system 120 of FIG. 3 can also have these specifications.

Figure 5:
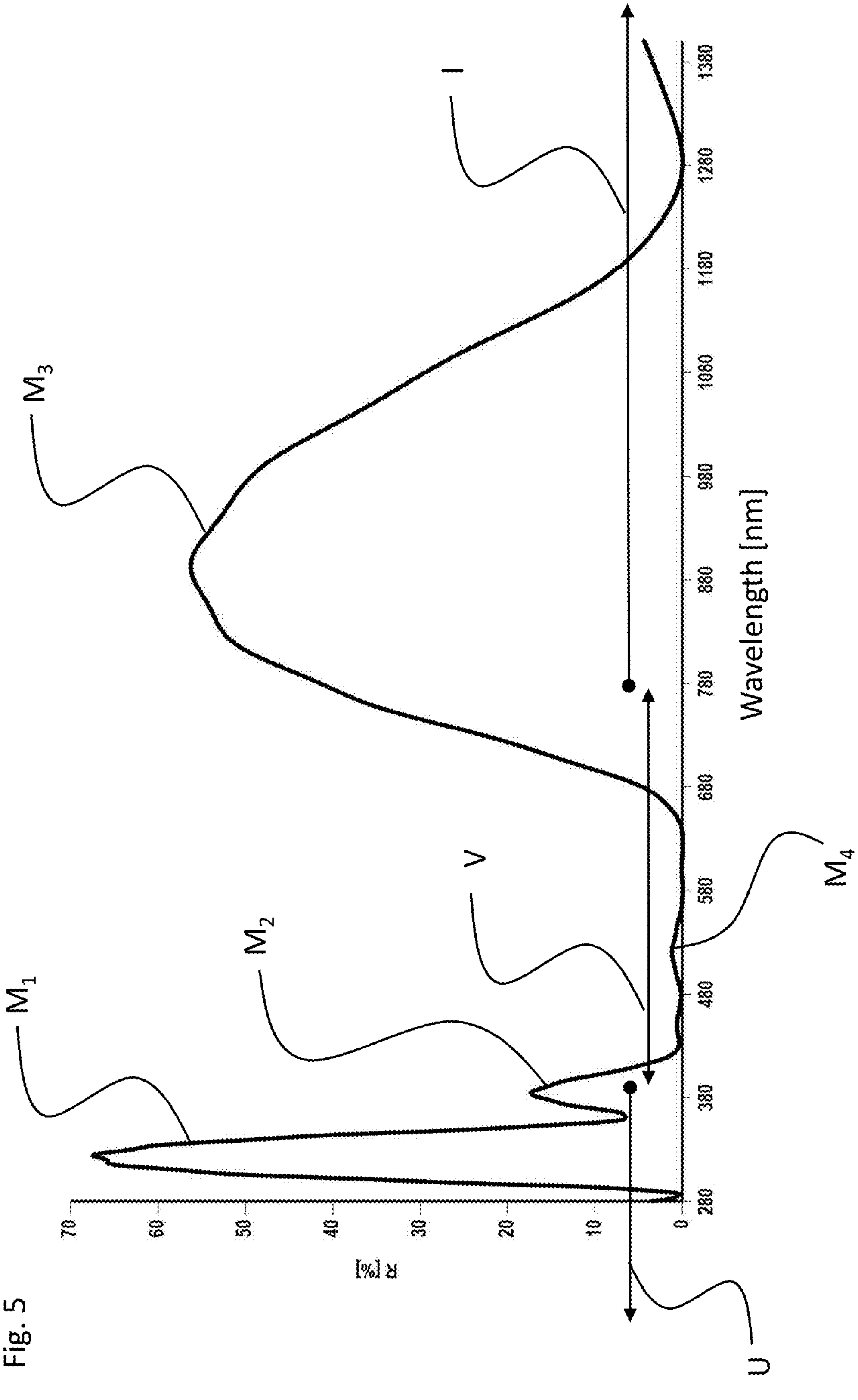
FIG. 5 shows a spectral plot of the reflectivity of a layer system specified according to FIG. 4 at a viewing angle of about 0°.

FIG. 5 is a spectral plot of measured reflectivity of a system similar to the layer system specified in FIG. 4 at a viewing angle of about 0°, for example at 8°. In other words, the spectral plot of the reflectivity R corresponds to the proportion of the reflected light $L_r$ in relation to the incident light $L_0$ in a vertical top view of the uppermost or most distant surface of the layer sheets, starting from the substrate base. The viewer here can in particular be a photodetector, which can detect spectrally-resolved intensities $I_r$ of the reflected light $L_r$, in particular between about 280 nm and about 1400 nm. In particular, the reflectivity is recorded for a certain angular range, in particular between about 0° and about 60°, preferably between about 8° and about 50°, using a PerkinElmer directional transmission and reflection apparatus.

To determine the reflectivity R, the intensity $I_0$ of the incident light $L_0$ is also recorded in a spectrally resolved manner, so that a relationship between $I_r$ and $I_0$ can be established to determine the reflectivity. A photodetector (e.g. a goniophotometer) can, for example, be located on a goniometer arm and be moved or rotated with the arm by the viewing angle 0° with the perpendicular or the substrate normal in order to be able to carry out further such spectral measurements at other viewing angles α.

The spectral plot of the reflectivity R substantially comprises three range portions, namely for parts of the UV range U, in particular for the UV-A and the UV-B range, for the visible range V, and for parts of the near-infrared range I, in particular for the IR-A range.

The spectral plot of the reflectivity R substantially shows three clear maxima $M_1$, $M_2$, $M_3$ and a comparatively weak maximum $M_4$. In particular, the plot shows a "window area" in which the reflectivity is particularly low and which substantially comprises the majority of the visible area.

As can be seen from the maximum $M_1$, the reflectivity R at about 300 nm is almost about 70%, in particular about 65-68%. This results in a particularly high level of protection against UV-B radiation, since almost 70% of the incident light $L_0$ is reflected on the layer sheets and a user's eyes or tissue are shielded from this harmful radiation by the layer system to a large extent.

A maximum $M_2$ at about 380 nm achieves a reflectivity of about 20%, in particular about 16-18%. The maximum $M_2$ includes parts of the spectral UV-A range and parts of the spectral visible range, substantially the violet shades and possibly blue shades of the visible range.

The maxima $M_1$ and $M_2$ result from a particularly preferred embodiment of the invention, wherein in addition to IR-A protection, UV protection is also to be achieved for a user.

According to the invention, a particularly prominent and broad maximum $M_3$ results between about 680 nm and about 1100 nm at a viewing angle of about 0°. In the exemplary spectral plot of FIG. 5, this maximum $M_3$ is at about 900 nm and reaches almost 60%. In detail, the reflectivity R rises steeply at about 670 nm, reaches the maximum $M_3$ at about 880-900 nm, and then decreases toward higher wavelengths so that it reaches a minimum at about 0% at about 1280 nm. The wavelength range around the maximum $M_3$, in which the reflectivity is above 5-10%, partially includes the visible range with red shades and a large portion of the IR-A range, in particular the range in which the radiation was found to be harmful. The spectral half-width of the maximum $M_3$ is about 400 nm in the present case. The spectral half-width of the maximum $M_3$ is generally in particular about 200 nm to about 900 nm, preferably about 300 nm to about 500 nm, and particularly preferably about 350 nm to about 450 nm.

In the present case, the maximum $M_3$ has a region of a high slope/gradient between about 680 nm and about 880 nm. The slope in this region is about 40% per 100 nm. The region of the high slope can vary, for example, depending on the viewing angle and in particular between about 560 nm and about 1000 nm, preferably between about 570 nm and about 920 nm, and particularly preferably between about 580 nm and about 900 nm. The slope in this region is in particular between about 20% per 100 nm and about 80% per 100 nm, preferably between about 30% per 100 nm and about 60% per 100 nm, and particularly preferably between about 35% per 100 nm and about 45% per 100 nm.

In other words, the high reflectivity around the maximum $M_3$ in a wide range, in particular including the IR-A range, indicates a high reflectivity, which ensures particularly good protection of a user from IR-A radiation.

Figure 6:
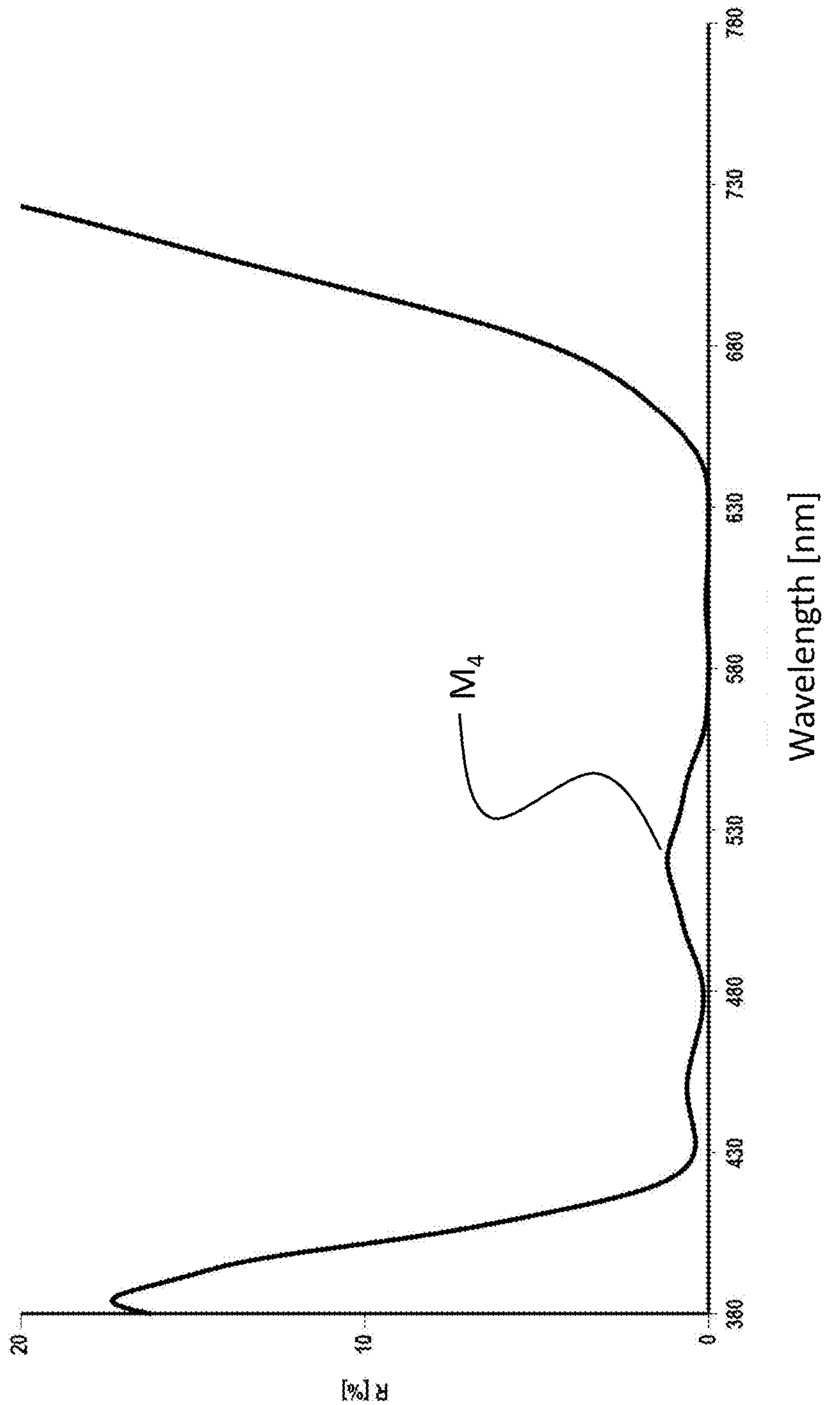
FIG. 6 shows a detailed view of a region of the spectral plot of the reflectivity of FIG. 5.

FIG. 6 is a detailed view of a region of the spectral plot of the reflectivity R of FIG. 5. The spectral plot of the reflectivity between 380 nm and 780 nm is shown, so that in particular the maximum $M_4$ is clear at about 510-530 nm. At higher and lower wavelengths with regard to the maximum $M_4$, the reflectivity R reaches about 0%. For example, at about 480 nm and between about 580 nm and 630 nm, almost complete transmission, i.e. a reflectivity of about 0%, is achieved. The maximum $M_4$ of reflectivity, which lies at wavelengths slightly shorter than 530 nm, reaches about 2 to 3% as an absolute value of reflectivity. Between about 430 nm and 480 nm there is another, but significantly lower, maximum of the reflectivity R. This maximum will not be described in more detail here.

The reflection behavior beyond 780 nm is particularly insignificant in the present case.

Figure 7:
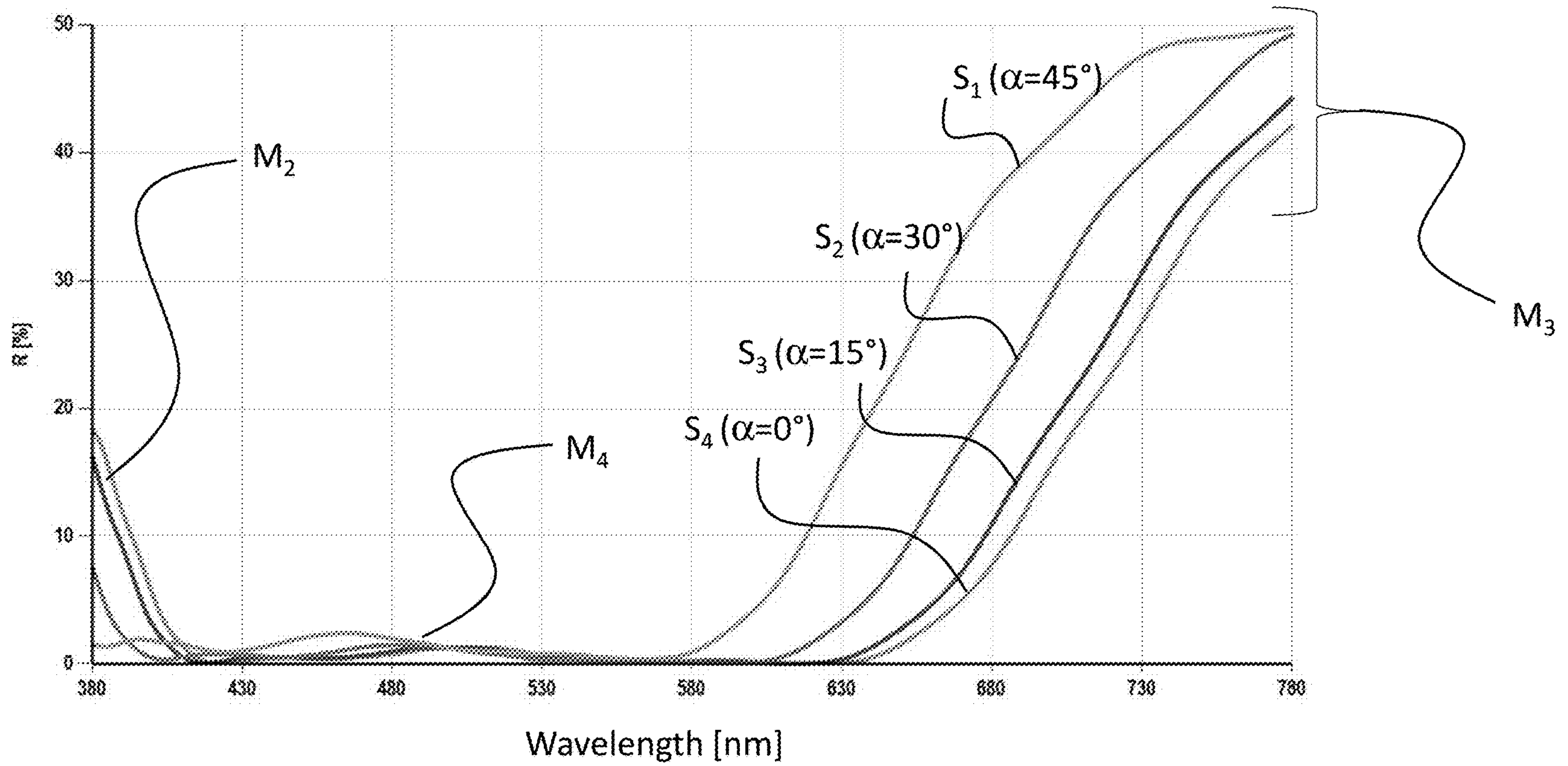
FIG. 7 shows the spectral plot of the reflectivity of the layer system shown in FIG. 4 for four different viewing angles.

FIG. 7 is the spectral plot $S_1$, $S_2$, $S_3$, $S_4$ of a measured reflectivity R of a system similar to the layer system shown in FIG. 4 for four different viewing angles, corresponding to about 45°, 30°, 15° and 0°. As can be seen from the plots, the courses of the respective spectrally plotted reflectivity R are relatively similar to one another for different viewing angles, but the courses are shifted relative to one another. The spectral plot $S_1$ for the viewing angle of about 45° is shifted to lower wavelengths relative to the other plots. For example, the rise to maximum $M_3$ begins at about 580 nm, whereas $S_2$ begins to rise to maximum $M_3$ at about 630 nm at a viewing angle of about 30°, and $S_3$ begins to rise to maximum $M_3$ at about 650 for a viewing angle of about 15° and for a viewing angle of about 0° nm. In addition, the maxima $M_2$ and $M_4$ also shift to about the same extent for the different spectral plots $S_1$, $S_2$, $S_3$, $S_4$.

The result is that a very clearly visible reflection in red shades can be seen at a viewing angle of about 45°. If the viewing angle decreases, the reflection becomes less and less visible, since the spectral plot of reflectivity at small viewing angles, as described above, shifts in such a way that the maximum or the rise to the maximum $M_3$ is at higher wavelengths, especially in the IR-A range.

This is shown in particular by the fact that the reflectivity R starting at a wavelength of about 630 nm, in particular at about 680 nm and at a viewing angle α of about 45°

- is between about 10% and 20%, in particular about 15% higher than at a viewing angle α of about 30°;
- is between about 20% and 30%, in particular about 25% higher than at a viewing angle α of about 15°; and
- is between about 23% and 33%, in particular about 27% higher than at a viewing angle α of about 0°.

In addition, the reflectivity R at a viewing angle α of about 45° and a wavelength of

- about 630 nm has a value between about 10% and about 20%, in particular between about 13% and about 17%;
- about 680 nm has a value between about 30% and about 40%, in particular between about 33% and about 39%; and
- about 730 nm has a value between about 43% and about 53%, in particular between about 45% and about 50%.

The remaining mirror coating in the optical region, especially for green and red shades, becomes "visible" especially when viewed at a minimum angle: When viewed straight from above, i.e. at a viewing angle of about $\alpha \leq 30°$, in particular at about 0°, a viewer perceives a high anti-reflection effect, especially in the visible range, i.e. also in the red wavelength range, and only a negligible residual reflection of a green shade, i.e. for wavelength ranges in which electromagnetic radiation appears green to a viewer. When viewed at a viewing angle of about $\alpha > 30°$, a viewer can surmise the protective properties against IR-A radiation due to the reflection in the red wavelength range, since red shades that are still partially visible are reflected from this viewing angle.

The high anti-reflective effect in the visible wavelength range is retained up to a certain viewing angle. From this particular viewing angle, the anti-reflective coating turns into a visible red mirror coating, which makes the IR protection clear to the viewer. A specific viewing angle of about 30° substantially corresponds to an angle at which the reflective effect of the layer system becomes particularly visible to a viewer. From this viewing angle, the layer system no longer allows a viewer from the outside, i.e. on the side of the incident light, i.e. on the side opposite the person wearing spectacles, to "see" behind the layer system, since the mirror coating or reflectivity in the visible range reaches a high value. This angle can be varied moderately by changing or varying the layer thicknesses, while maintaining the properties described. As part of the development of the layer, the typical position of wear of the lenses in the frame can be taken into account in order to prevent annoying glare effects for the spectacles wearer due to the red mirror coating being inserted too early.

The maximum $M_3$ has a region of high gradient/slope between about 580 nm and about 900 nm for all indicated viewing angles α. The slope in this region is about 40% per 100 nm for all plots shown. The region of the high slope can vary, for example, depending on the viewing angle and in particular between about 560 nm and about 1000 nm, preferably between about 570 nm and about 920 nm, and particularly preferably between about 580 nm and about 900 nm. The slope in this region is in particular between about 20% per 100 nm and about 80% per 100 nm, preferably between about 30% per 100 nm and about 60% per 100 nm, and particularly preferably between about 35% per 100 nm and about 45% per 100 nm.

A layer system according to one of the mentioned aspects and/or embodiments can, on the one hand, be determined theoretically using a simulation by using the optical constants and layer thicknesses of the layer sheets of a selected material as the basis for the calculation. On the other hand, a layer system that has already been produced can be examined for its reflective properties using a suitable reflection measurement. It is of particular interest at which angle which spectral components of light are reflected or transmitted. In other words, a reflection measurement should show which colors are mirrored on the layer system or allowed to pass through the layer system at which incidence and viewing angles.

A reflection measurement is preferably carried out on a substantially planar layer system with negligible surface curvature, such as shown in FIG. 1 and FIG. 2, in particular in order to be able to better control the ratios of the incidence and viewing angles. However, it is also conceivable that a curved surface of a layer system, for example a lens, in particular a spectacle lens—as shown e.g. in FIG. 3—can be examined using a suitable reflection measurement. In practice, however, it is relatively difficult to hit the same point with the incident light beam at different angles, in particular at high angles, even on a planar surface. Therefore, it can be difficult to reliably characterize a curved surface in terms of reflectivity. In general, it is generally comparatively difficult to obtain reliable data for high angles of incidence, particularly for angles of incidence between about 40° and about 90°, in terms of polarization, beam profile, measurement spot size, and beam offset through the backside of the sample. For example, the reflectivity and transmission properties for different polarizations of the incident light can vary greatly, particularly in the range between about 40° and about 85° for the incidence angle. Furthermore, the area that is irradiated can also vary at different, particularly flat, angles of incidence.

Commercial spectrometers, such as those sold by manufacturers such as PerkinElmer, are particularly suitable for examining the reflection properties of a layer system, for example the "Perkin Elmer Lambda 750 UV/Vis/NIR" model, which-equipped with corresponding accessory (URA, Universal Reflectance Accessory)-reliably enables substantially unpolarized reflection measurements at different angles. Such a setup was used for the reflection measurements presented in this document.

Figure 8:
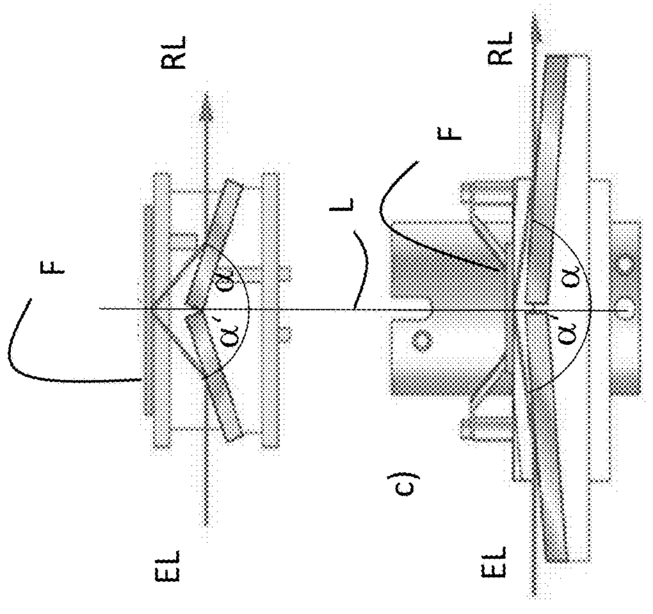
FIG. 8*a*) shows schematically an exemplary arrangement of the surface to be examined with regard to the incident and reflected light.
FIG. 8*b*) shows schematically an exemplary measuring arrangement at an incidence angle of about 45°.
FIG. 8*c*) shows schematically an exemplary measuring arrangement at an incidence angle of about 80°.
Figure 8:
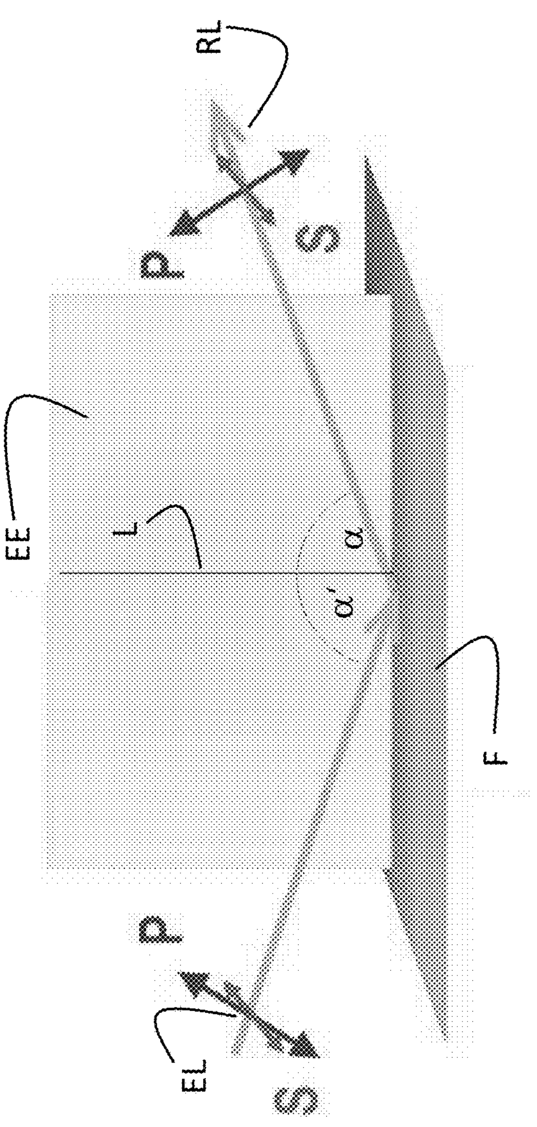

FIG. 8*a*) shows schematically an exemplary arrangement of the surface F to be examined with regard to the incident light EL and the reflected light RL. A fictitious plane of incidence EE indicates the symmetries. The plane of incidence is substantially determined by the perpendicular of the surface to be examined at the point of incidence of the incident light EL and the wave vector or the direction of propagation of the incident light EL.

The incident light can ideally comprise substantially coherent and parallel radiation, particularly under laboratory conditions. At least the incident light during a measurement has a light with a main direction of propagation and a high proportion of mutually parallel beams of rays, so that the angle between the perpendicular L and the incident light EL can be defined as precisely as possible. In use, it goes without saying that everyday light sources generally do not contain parallel beams of rays and therefore represent isotropic or scattering light sources.

The measuring arrangement generally does not allow reflection measurements at the incidence angle α' and the viewing angle α of respectively exactly 0°. Typically, the actual smallest angle α' or α at which the reflectivity can just be measured is above 0° and below about 15°, in particular between about 3° and about 10°. This angle that can actually just be detected is device-specific, i.e. depending on the device it can be e.g. about 3° or e.g. about 8°. The angles α' and a of about 0° indicated in this document actually include angles that are slightly above 0°. In particular, the smallest angle α' or a to be measured is about 3°, so that the sum of both angles α' and a, which corresponds to the opening angle enclosed by the incident light EL and the reflected light RL, is about 6°, i.e. twice 3°. The incidence angle α' and the viewing angle α are the respective half angles that are enclosed by the perpendicular of the surface at the point of incidence of the light and the incident light beam or the reflected light beam.

FIG. 8*a*) indicates that at least parts of the light EL incident on the surface F to be examined and the light RL reflected from the surface can have a polarization, for example a polarization P parallel to the plane of incidence EE and/or a polarization S perpendicular to the plane of incidence EE.

The measurements shown in this document, in particular the reflectivity plots or reflection curves as shown e.g. in FIG. 5, FIG. 6, and FIG. 7, were substantially carried out with unpolarized incident light EL. In other words, this means that at least the incident light does not have any collective polarization, for example in the S or P direction.

FIG. 8*b*) shows schematically an exemplary measuring configuration at an incidence angle α' of about 45°. FIG. 8*c*) shows schematically an exemplary measuring configuration at an incidence angle α' of about 80°. The incidence angle α' and the reflection angle α, which corresponds to the viewing angle, are adjusted using rotatable mirrors, so that the incident light EL is sent from below onto the surface to be examined using a first mirror and the reflected light is reflected at an at least partially reflecting surface at the angle α and exits the setup via the second mirror. The measuring configuration shown in FIG. 8c) indicates particularly large angles α' and a to the perpendicular. Alternatively, instead of rotatable mirrors, the setup can also include optical reflecting elements on at least one servomotor and/or on a rotatable goniometer arm in order to move to different angular positions.

FIG. 9 is the tabular representation of spectral parameters of the reflection curve of an exemplary layer system for four different viewing angles α, namely for about 0°, about 15°, about 30° and about 45°, shown in FIG. 5. Below, the trends for the individual variables shown will be explained in more detail depending on the respective viewing angle. A supplementary explanation will be given in connection with FIGS. 10a-e.

The reflection properties are described by the parameters Rv, Rv', L*, C*, h*, and by RM_(380-780 nm) in the visible range and RM_(780-1150 nm) in the IR-A range as well as by appropriate calculation of the reflection values in the IR-A range with the thermal weighting function described according to the ICNIRP guidelines 2013.

The parameters L*, C*, h* refer in particular to the luminosity, saturation, and the color value in the color wheel in polar coordinates (DIN 11664-1/2). Rv and Rv' refer in particular to the visual light reflectance (DIN 13666), where Rv concerns daytime vision and Rv' concerns twilight vision. RM refers to the averaged reflectance value. In particular, RM_(380-780 nm) refers to the reflectivity in the visible range, specifically for the range between 380 nm and 780 nm, and RM_(780-1150 nm) refers to the reflectivity in the infrared range between 780 nm and 1150 nm. The reflection value is averaged in particular by averaging all reflection values over all wavelengths in the corresponding wavelength range. The averaged reflection is calculated according to DIN EN ISO 13666:2019, with the integration limits being adjusted accordingly.

The luminosity L* increases gradually from low angles to about 45°. In other words, this means that the luminosity at 45° is comparatively higher than at lower angles, namely about 18.8, whereas the luminosity at about 0° is only about 4.7.

Just like luminosity, saturation C* increases at higher angles. The saturation at about 45° has a value of about 41.2, whereas at about 0° it has a value of about 2.8.

The color value in the color wheel in polar coordinates h* is about 195.1 for about 0° and drops to about 10.7 up to about 45°. This substantially corresponds to a color shift from substantially green colors to red colors, which will be explained in more detail in FIGS. 10a-e.

The light reflection values Rv for daytime vision and Rv' for twilight vision increase from about 0.52% and about 0.77%, respectively, at about 0° to about 2.7% and about 1.4%, respectively.

The reflectivity in the visible range RM_(380-780 nm) increases from a value at about 0° of 8% to about 16.7% at about 45°. On the other hand, the reflectivity in the IR range RM_(780-1150 nm) drops from a value at about 0° of about 35.8% to about 23.6% at around 45°.

FIG. 10a) shows a C*h* plot for residual reflex colors when the viewing angle α varies from about 0° to about 45°. In other words, the course of the residual reflex colors is shown when the viewing angle α varies from about 0° to about 45°, with the color value being plotted in polar coordinates on the color wheel. The points in the color wheel each correspond to a color and are represented in color between about 0° and about 45° in the plot. The trend of the residual reflex color can be seen, which appears green at the angle α of about 0°, at the angle α of about 23° has green and red color components, and at the angle α of about 45° is substantially red.

FIG. 10b) shows the course of the residual reflex color in a different representation, namely when the viewing angle α varies from about 0° to about 45°, where the color value is selected as a color plot against the viewing angle α. Here as well, the trend can be seen that the residual reflex color appears substantially green at the angle α of about 0°, at the angle α of about 23° it has green and red color components, and at the angle α of about 45° it is substantially red.

FIG. 10c) shows the plot of the luminosity L* against the viewing angle α. The luminosity shows substantially constant values of about 4 between about 0° and about 25°. From about 30°, the luminosity L* increases steadily and, in particular between about 38° and about 43°, seemingly constantly with about 10 units per 10° and reaches the value L* of about 15 at about 45°. The luminosity therefore increases steadily with a larger viewing angle α.

The plots in FIG. 10d) and FIG. 10e) show a largely similar behavior to the plot in FIG. 10c). FIG. 10d) shows the plot of the visual light reflectance Rv' for twilight vision against the viewing angle α. The plot of the visual light reflectance Rv' shows substantially constant values of about 0.6% between about 0° and about 25°. From about 35°, the visual light reflectance Rv' increases steadily and reaches the value Rv' of about 1.1% at about 45°. Thus, the visual light reflectance Rv' for twilight vision increases steadily with a larger viewing angle α. FIG. 10e) shows the plot of the visual light reflectance Rv for daytime vision against the viewing angle α. The visual light reflectance Rv shows substantially constant values of about 0.5% between about 0° and about 25°. From about 35°, the visual light reflectance Rv increases steadily and reaches the value Rv' of about 1.8% at about 45°. Thus, the visual light reflectance Rv for daytime vision increases steadily with a larger viewing angle α.

Further features used in the description will be specified and described in more detail below.

Vehicle windows include in particular windows, such as windshield panes and/or rear window panes for motor vehicles, passenger vehicles and trucks and/or window panes for trains, airplanes, motorcycles or other vehicles.

The high-refraction and low-refraction layer sheets substantially correspond to optically active or optically relevant layer sheets, which are substantially responsible for the reflectivity of the layer system. It cannot be ruled out that further functional layer sheets can also have high or low-refraction and thus contribute to the optical activity, but such layer sheets preferably contribute substantially not or only to a small extent to the reflectivity of the layer system.

Suitable examples of layer materials with different refractive indices are silicon dioxide ($SiO_2$) with a refractive index n of about 1.46, aluminum oxide ($Al_2O_3$) with a refractive index n of about 1.7, zirconium dioxide ($ZrO_2$) with a refractive index n of about 2.05, praseodymium titanium oxide ($PrTiO_3$) with a refractive index n of about 2.1, titanium oxide ($TiO_2$) and zinc sulfide (ZnS) each with a refractive index n of about 2.3. The values mentioned represent average values measured at a wavelength of about 550 nm, wherein the values can vary by up to 10% depending on the coating process and the layer thickness. Common optical glasses/lenses have refractive indices between about 1.5 and 2.0. Layer materials with refractive indices smaller than about 1.5 such as $MgF_2$, $SiO_2$, $Al_2O_3$ are therefore referred to as low-refraction materials in combination with optical glasses/lenses, layer materials with refractive indices larger than about 2.0 such as $ZrO_2$, $PrTiO_3$, $TiO_2$, ZnS are referred to as high-refraction materials in combination with optical glasses/lenses. The difference in refractive indices between high and low-refraction materials is therefore at least 0.2 to at least 0.5, depending on the coating process and the layer thickness.

Layer sheets with higher refraction can in particular include at least one of the materials $Ta_2O_5$, $TiO_2$, $Ti_xO_y$, $ZrO_2$, $Al_2O_3$, $Nd_2O_5$, $Pr_2O_3$, $PrTiO_3$, $La_2O_3$, $Nb_2O_5$, $Y_2O_3$, $HfO_2$, ITO (Indium Tin Oxide), ZnS, $Si_3N_4$, MgO, $CeO_2$ and their modifications, in particular their other oxidation states. These materials are known as materials with a high classic refractive index for use in optical elements, such as for coating spectacle lenses. However, the layer sheets with higher refraction can also contain $SiO_2$ or other lower-refraction materials as long as the refractive index of the entire partial layer is greater than 1.6.

Layer sheets with lower refraction can in particular include at least one of the materials SiO, $SiO_2$, silanes, siloxanes. However, the layer sheets with lower refraction can also contain a mixture of $SiO_2$ and $Al_2O_3$. The layer sheets with lower refraction can preferably contain at least 80 percent by weight of $SiO_2$, particularly preferably at least 90 percent by weight of $SiO_2$.

The materials used for this type of coating are the typical materials applied in optics using e.g. PVD processes (PVD=Physical Vapor Deposition) or CVD processes (CVD=Chemical Vapor Deposition). This means that $SiO_2$ and mixtures with $SiO_2$ are preferred as materials with lower refraction. All typical high-refraction oxidic materials and their mixtures are possible as high-refraction materials ($Ta_2O_5$, $Ti_xO_y$, $ZrO_2$, etc.). The choice of a specific material composition, as was sometimes necessary with previous coatings, is no longer possible with the layer system according to the invention. All typical high-refraction metal oxides and their mixtures from the optical industry can be used as materials with higher refraction ($Ta_2O_5$, $Ti_xO_y$, $ZrO_2$, and the like).

All typical low-refraction metal oxides and their mixtures from the optical industry can be used as materials with lower refraction (SiO, $SiO_2$, $SiO_2$ with additives Al, SiO as well as silanes and siloxanes in pure form or with their fluorinated derivatives, and the like).

Depending on the packing density, $SiO_2$ typically has a refractive index of 1.46 to 1.62, $Al_2O_3$ typically has a refractive index of 1.67. The difference in the refractive indices of the sublayer with higher refraction and the sublayer with lower refraction is therefore between 0.2 and 0.5.

The surfaces of the layer sheets and/or the substrate surface can be activated and/or functionalized using plasma conditioning. For example, a plasma can comprise Ar, $O_2$, $N_2$, or similar gases.

A reflectivity maximum can generally be determined such that the absolute value of the local maximum for reflectivity is determined. Alternatively, a difference in reflectivity between the local maximum and the local minima on both sides can be determined. In particular, the local minima on both sides of the local maximum are about the same value, in particular at a reflectivity of about 0%. If this is not the case, the average difference in reflectivity between the local maximum and the local minima on both sides can also be used, or a baseline can be considered.

All specifications of values are to be understood as possible specifications within the scope of measurement accuracy.

LIST OF REFERENCE NUMERALS

1 first layer: first high-refraction layer sheet
2 second layer: first low-refraction layer sheet
3 third layer: second high-refraction layer sheet
4 fourth layer: second low-refraction layer sheet
5 fifth layer: third high-refraction layer sheet
6 sixth layer: third low-refraction layer sheet
7 seventh layer: fourth high-refraction layer sheet
8 eighth layer: functional layer sheet
9 ninth layer: fourth low-refraction layer sheet
10 tenth layer: care layer sheet
11 substrate base
100 layer system according to one embodiment
110 layer system according to one embodiment
120 layer system according to one embodiment
130 layer system according to one embodiment
$\alpha$, $\alpha_1$, $\alpha_2$ viewing angle, reflection angle
$\alpha'$ incidence angle
$\alpha$ substrate sheet of the substrate base
b hard layer sheet
$B_1$ user, for example a spectacles wearer in the usual position of wear on the side of the layer system facing away from the incident light
$B_2$ viewer in plan view from the side of the layer system facing the incident light
c adhesion layer sheet
$d_1$ layer sheet thickness of the first layer
$d_2$ layer sheet thickness of the second layer
$d_3$ layer sheet thickness of the third layer
$d_4$ layer sheet thickness of the fourth layer
$d_5$ layer sheet thickness of the fifth layer
$d_6$ layer sheet thickness of the sixth layer
$d_7$ layer sheet thickness of the seventh layer
$d_8$ layer sheet thickness of the eighth layer
$d_9$ layer sheet thickness of the ninth layer
$d_{10}$ layer sheet thickness of the tenth layer
$d_b$ layer sheet thickness of the layer sheet b of the substrate base
$d_c$ layer sheet thickness of the layer sheet c of the substrate base
EE plane of incidence
EL light incident on a surface
F at least partially reflective surface
$F_a$ substrate surface
I infrared spectral range
L perpendicular of a surface to be examined in the point of incidence of the incident light
$L_0$, $L_{01}$, $L_{02}$ incident light with intensity $I_0$
$L_r$, $L_{r1}$, $L_{r2}$ reflected light with intensity $I_r$
$L_t$ transmitted light with intensity $I_t$
$M_1$ reflectivity maximum
$M_2$ reflectivity maximum
$M_3$ reflectivity maximum
$M_4$ reflectivity maximum
$N_1$ substrate normal
$N_2$ substrate normal
$N_3$ substrate normal
$N_a$ substrate normal
$N_b$ substrate normal
P parallelly polarized light
RL light reflected from a surface
S vertically polarized light
$S_1$ reflectivity spectrum
$S_2$ reflectivity spectrum
$S_3$ reflectivity spectrum
$S_4$ reflectivity spectrum U spectral ultraviolet range V spectral visible range

The invention claimed is:

1. A layer system with infrared mirror coating, comprising:

a substrate base having a substrate sheet with a substrate surface; and a plurality of low-refraction layer sheets and a plurality of high-refraction layer sheets, wherein a high-refraction layer sheet and a low-refraction layer sheet are arranged alternately on the substrate surface in such a way that the layer system at a detection angle of about 0° with at least one substrate normal of the substrate surface:

has a reflectivity for electromagnetic radiation of R≥15% for at least a wavelength range between about 680 nm and about 1,100 nm; and has a reflectivity for electromagnetic radiation of R≤5% for at least a wavelength range between about 400 nm and about 680 nm, wherein a reflectivity of the layer system starting from a wavelength of about 630 nm for a viewing angle $\alpha$ of about 45°, the viewing angle $\alpha$ being enclosed by the substrate normal with a propagation direction of reflected light:

is between about 10% and 20% higher than at a viewing angle $\alpha$ of about 30°; is between about 20% and 30% higher than at a viewing angle $\alpha$ of about 15°; and is between about 23% and 33% higher than at a viewing angle $\alpha$ of about 0°.

2. The layer system according to claim 1, wherein one of the low-refraction layer sheets includes $SiO_2$.

3. The layer system according to claim 1, wherein a last optically active layer sheet of the plurality of low-refraction layer sheets and the plurality of high-refraction layer sheets is a low-refraction layer sheet.

4. The layer system according to claim 1, wherein the plurality of low-refraction layer sheets and the plurality of high-refraction layer sheets are arranged on the substrate surface in such a way that the layer system at a detection angle of about 0° with the substrate normal of the substrate surface:

has a reflectivity for electromagnetic radiation of R≥10% for at least a wavelength range between about 280 nm and about 400 nm.

5. The layer system according to claim 1, wherein the plurality of low-refraction layer sheets and the plurality of high-refraction layer sheets are arranged on the substrate surface in such a way that the layer system at a detection angle of about 0° with the substrate normal of the substrate surface:

has a reflectivity maximum of electromagnetic radiation of R≤1% for at least a wavelength range between about 400 nm and about 680 nm.

6. The layer system according to claim 1, wherein the plurality of high-refraction layer sheets comprise at least one material selected from a group consisting of: $Ta_2O_5$, $TiO_2$, $Ti_xO_y$, $ZrO_2$, $Al_2O_3$, $Nd_2O_5$, $Pr_2O_3$, $PrTiO_3$, $La_2O_3$, $Nb_2O_5$, $Y_2O_3$, $HfO_2$, ITO (Indium Tin Oxide), ZnS, $Si_3N_4$, MgO, $CeO_2$.

7. The layer system according to claim 1, wherein the plurality of low-refraction layer sheets comprise at least one material selected from a group consisting of: $MgF_2$, SiO, $SiO_2$, silanes, siloxanes, a mixture comprising $SiO_2$ and $Al_2O_3$.

8. The layer system according to claim 1, wherein the layer sheets, starting from the substrate base, arranged in the following order comprise:

a first high-refraction layer sheet;

a first low-refraction layer sheet;

a second high-refraction layer sheet;

a second low-refraction layer sheet;

a third high-refraction layer sheet;

a third low-refraction layer sheet;

a fourth high-refraction layer sheet; and a fourth low-refraction layer sheet.

9. The layer system according to claim 8, wherein the low-refraction layer sheets homogeneously have a low-refraction material and/or the high-refraction layer sheets homogeneously have a high-refraction material.

10. The layer system according to claim 1, wherein the layer sheets, starting from the substrate base, arranged in the following order comprise:

a first high-refraction layer sheet with a layer sheet thickness of at least about 118 nm;

a first low-refraction layer sheet with a layer sheet thickness of at least about 135 nm;

a second high-refraction layer sheet with a layer sheet thickness of at least about 70 nm;

a second low-refraction layer sheet with a layer sheet thickness of at least about 80 nm;

a third high-refraction layer sheet with a layer sheet thickness of at least about 5 nm;

a third low-refraction layer sheet with a layer sheet thickness of at least about 35 nm;

a fourth high-refraction layer sheet with a layer sheet thickness of at least about 55 nm; and a fourth low-refraction layer sheet with a layer sheet thickness of at least about 60 nm.

11. The layer system according to claim 1, wherein the layer sheets, starting from the substrate base, arranged in the following order comprise:

a first high-refraction layer sheet with a layer sheet thickness of at most about 130 nm;

a first low-refraction layer sheet with a layer sheet thickness of at most about 160 nm;

a second high-refraction layer sheet with a layer sheet thickness of at most about 120 nm;

a second low-refraction layer sheet with a layer sheet thickness of at most about 105 nm;

a third high-refraction layer sheet with a layer sheet thickness of at most about 15 nm;

a third low-refraction layer sheet with a layer sheet thickness of at most about 45 nm;

a fourth high-refraction layer sheet with a layer sheet thickness of at most about 80 nm; and a fourth low-refraction layer sheet with a layer sheet thickness of at most about 80 nm.

12. The layer system according to claim 1, wherein the layer sheets, starting from the substrate base, arranged in the following order comprise:

a first high-refraction layer sheet with a layer sheet thickness of about 121.5 nm;

a first low-refraction layer sheet with a layer sheet thickness of about 151 nm;

a second high-refraction layer sheet with a layer sheet thickness of about 106.2 nm;

a second low-refraction layer sheet with a layer sheet thickness of about 95.2 nm;

a third high-refraction layer sheet with a layer sheet thickness of about 12.1 nm;

a third low-refraction layer sheet with a layer sheet thickness of about 42 nm;

a fourth high-refraction layer sheet with a layer sheet thickness of about 59.6 nm; and a fourth low-refraction layer sheet with a layer sheet thickness of about 74.9 nm.

13. The layer system according to claim 1, further comprises:

a functional layer sheet having a layer sheet thickness of at least about 8 nm and at most about 11 nm.

14. The layer system according to claim 1, wherein the substrate base further comprises:

a protective layer sheet with a layer sheet thickness of at least about 500 nm and at most about 5 μm.

15. The layer system according to claim 1, wherein the substrate base comprises an optical element.

16. The layer system according to claim 1, wherein the substrate base comprises a pane.

17. The layer system according to claim 1, wherein the reflectivity of electromagnetic radiation in a wavelength range between about 560 nm and about 1000 nm, at least for a section of the wavelength range, has a reflectivity slope of between about 20% per 100 nm and about 80% per 100 nm.

18. A spectacle lens, wherein a layer system with infrared mirror coating according to claim 1 is arranged on an object side of the spectacle lens so that the spectacle lens forms the substrate base of the layer system.

19. The spectacle lens according to claim 18, wherein the spectacle lens on its side of an eye has a reflectivity for electromagnetic radiation of R≤5% for a wavelength range of about 400 nm to about 1,100 nm.

20. A layer system with infrared mirror coating, comprising:

a substrate base having a substrate sheet with a substrate surface; and a plurality of low-refraction layer sheets and a plurality of high-refraction layer sheets, wherein a high-refraction layer sheet and a low-refraction layer sheet are arranged alternately on the substrate surface in such a way that the layer system at a detection angle of about 0° with at least one substrate normal of the substrate surface;

has a reflectivity for electromagnetic radiation of R≥15% for at least a wavelength range between about 680 nm and about 1.100 nm; and has a reflectivity for electromagnetic radiation of R≤5% for at least a wavelength range between about 400 nm and about 680 nm, wherein a reflectivity of the layer system at a viewing angle α of about 45°, the viewing angle α being enclosed by the substrate normal with a propagation direction of reflected light, and a wavelength of:

about 630 nm has a value between about 10% and about 20%;

about 680 nm has a value between about 30% and about 40%; and about 730 nm has a value between about 43% and about 53%.

21. A method for producing a layer system with infrared mirror coating, comprising:

providing a substrate base including a substrate sheet with a substrate surface; and arranging, on the substrate surface, a plurality of low-refraction layer sheets and a plurality of high-refraction layer sheets, wherein a layer sheet with high-refraction properties and a layer sheet with low-refraction properties are arranged alternately so that the layer system at a detection angle of about 0° with a substrate normal of the substrate surface:

has a reflectivity for electromagnetic radiation of R≥15% for at least a wavelength range between about 680 nm and about 1,100 nm; and has a reflectivity for electromagnetic radiation of R≤5% for at least a wavelength range between about 400 nm and about 680 nm wherein a reflectivity of the layer system starting from a wavelength of about 630 nm for a viewing angle α of about 45°, the viewing angle α being enclosed by the substrate normal with a propagation direction of reflected light:

is between about 10% and 20% higher than at a viewing angle α of about 30°; is between about 20% and 30% higher than at a viewing angle α of about 150; and is between about 23% and 33% higher than at a viewing angle α of about 0°.

* * * * *